(12) United States Patent
Nakamura et al.

(10) Patent No.: US 10,277,544 B2
(45) Date of Patent: Apr. 30, 2019

(54) INFORMATION PROCESSING APPARATUS WHICH COOPERATE WITH OTHER APPARATUS, AND METHOD FOR CONTROLLING THE SAME

(71) Applicant: CANON KABUSHIKI KAISHA, Tokyo (JP)

(72) Inventors: Tomonori Nakamura, Kawasaki (JP); Makoto Hirota, Tokyo (JP); Yasuo Okutani, Kawasaki (JP); Kenichiro Nakagawa, Tokyo (JP); Hiromi Omi, Kamakura (JP); Rei Ishikawa, Gordon (AU); Masayuki Ishizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 715 days.

(21) Appl. No.: 14/776,645

(22) PCT Filed: Feb. 14, 2014

(86) PCT No.: PCT/JP2014/000762
§ 371 (c)(1),
(2) Date: Sep. 14, 2015

(87) PCT Pub. No.: WO2014/141591
PCT Pub. Date: Sep. 18, 2014

(65) Prior Publication Data
US 2016/0050173 A1   Feb. 18, 2016

(30) Foreign Application Priority Data
Mar. 15, 2013 (JP) .................. 2013-053600

(51) Int. Cl.
*H04L 12/58* (2006.01)
*H04N 1/00* (2006.01)
(Continued)

(52) U.S. Cl.
CPC .............. *H04L 51/10* (2013.01); *G06F 3/041* (2013.01); *G06F 3/04845* (2013.01);
(Continued)

(58) Field of Classification Search
CPC ..... G06F 3/041; G06F 3/04845; H04L 51/10; H04N 1/00127; H04N 1/00411;
(Continued)

(56) References Cited

U.S. PATENT DOCUMENTS

2008/0013787 A1* 1/2008 Kobayashi ......... G06K 9/00255
382/103
2008/0231914 A1* 9/2008 Motoyoshi ......... H04N 1/00411
358/474
(Continued)

FOREIGN PATENT DOCUMENTS

JP    2004-326281 A    11/2004
JP    2007-115167 A    5/2007
(Continued)

*Primary Examiner* — Gil H. Lee
(74) *Attorney, Agent, or Firm* — Canon U.S.A., Inc. IP Division

(57) ABSTRACT

An information processing apparatus is configured to transmit transmission target data to another information processing apparatus. The information processing apparatus includes a display control unit configured to display at least one object corresponding to the transmission target data together with a live view image on a display screen, and a receiving unit configured to receive an association operation for associating any one of the objects with any one of photographic subjects included in the live view image on the display screen. The information processing apparatus includes an identifying unit configured to identify another information processing apparatus associated beforehand with the photographic subject to be subjected to the association operation received by the receiving unit as a trans- (Continued)

mission destination to which the transmission target data corresponding to the object associated with the photographic subject is transmitted.

19 Claims, 22 Drawing Sheets

(51) Int. Cl.
    *G06F 3/041*     (2006.01)
    *G06F 3/0484*     (2013.01)
    *G06Q 10/10*     (2012.01)
    *H04N 101/00*     (2006.01)
    *H04N 5/232*     (2006.01)

(52) U.S. Cl.
    CPC ..... *H04N 1/00103* (2013.01); *H04N 1/00127* (2013.01); *H04N 1/00411* (2013.01); *H04N 1/00448* (2013.01); *G06Q 10/107* (2013.01); *H04N 5/23216* (2013.01); *H04N 2101/00* (2013.01); *H04N 2201/0084* (2013.01); *H04N 2201/3245* (2013.01); *H04N 2201/3273* (2013.01)

(58) Field of Classification Search
    CPC ........... H04N 1/00448; H04N 5/23216; H04N 2201/00; H04N 2201/0084; H04N 2201/3245; H04N 2201/3273
    See application file for complete search history.

(56) References Cited

U.S. PATENT DOCUMENTS

| | | | |
|---|---|---|---|
| 2009/0113330 A1* | 4/2009 | Garrison | G06F 3/0486 715/769 |
| 2013/0239019 A1* | 9/2013 | Pike | H04L 51/04 715/753 |
| 2014/0282728 A1* | 9/2014 | Matsunaga | G06F 3/0488 725/38 |

FOREIGN PATENT DOCUMENTS

| | | |
|---|---|---|
| JP | 2007-208863 A | 8/2007 |
| JP | 2011-040865 A | 2/2011 |
| JP | 2012-090077 A | 5/2012 |
| JP | 2013-016944 A | 1/2013 |

\* cited by examiner

[Fig. 1A]
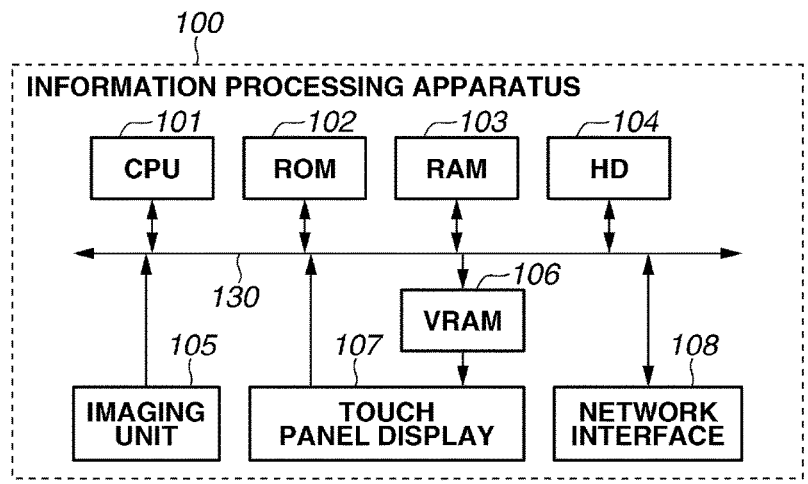
[Fig. 1B]
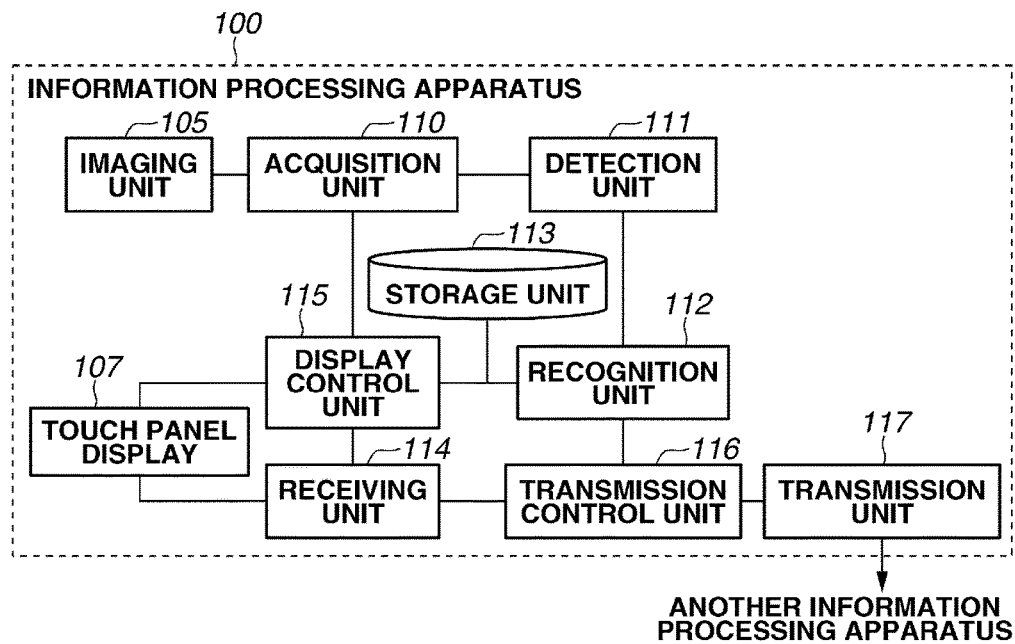
[Fig. 1C]
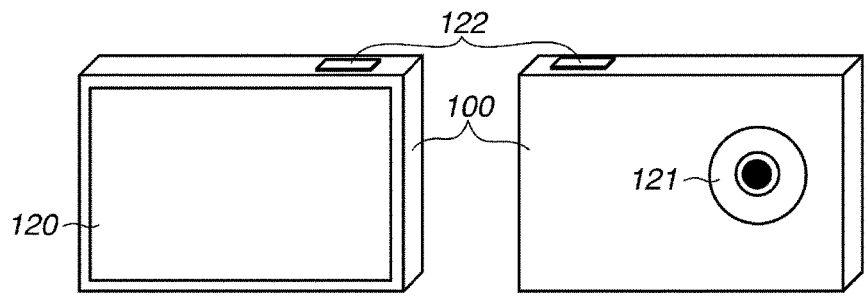

[Fig. 2A]
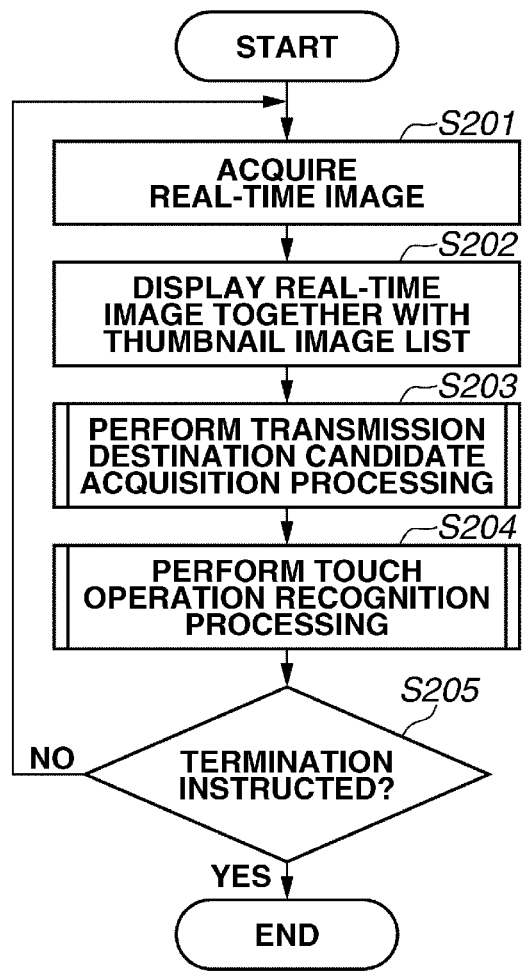

[Fig. 2B]
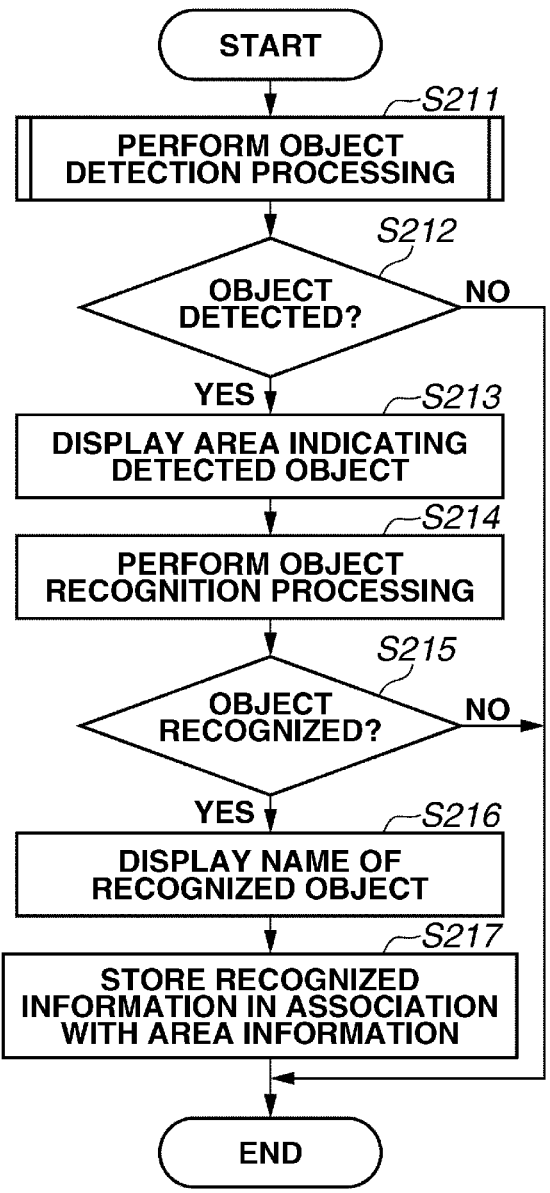

[Fig. 3]
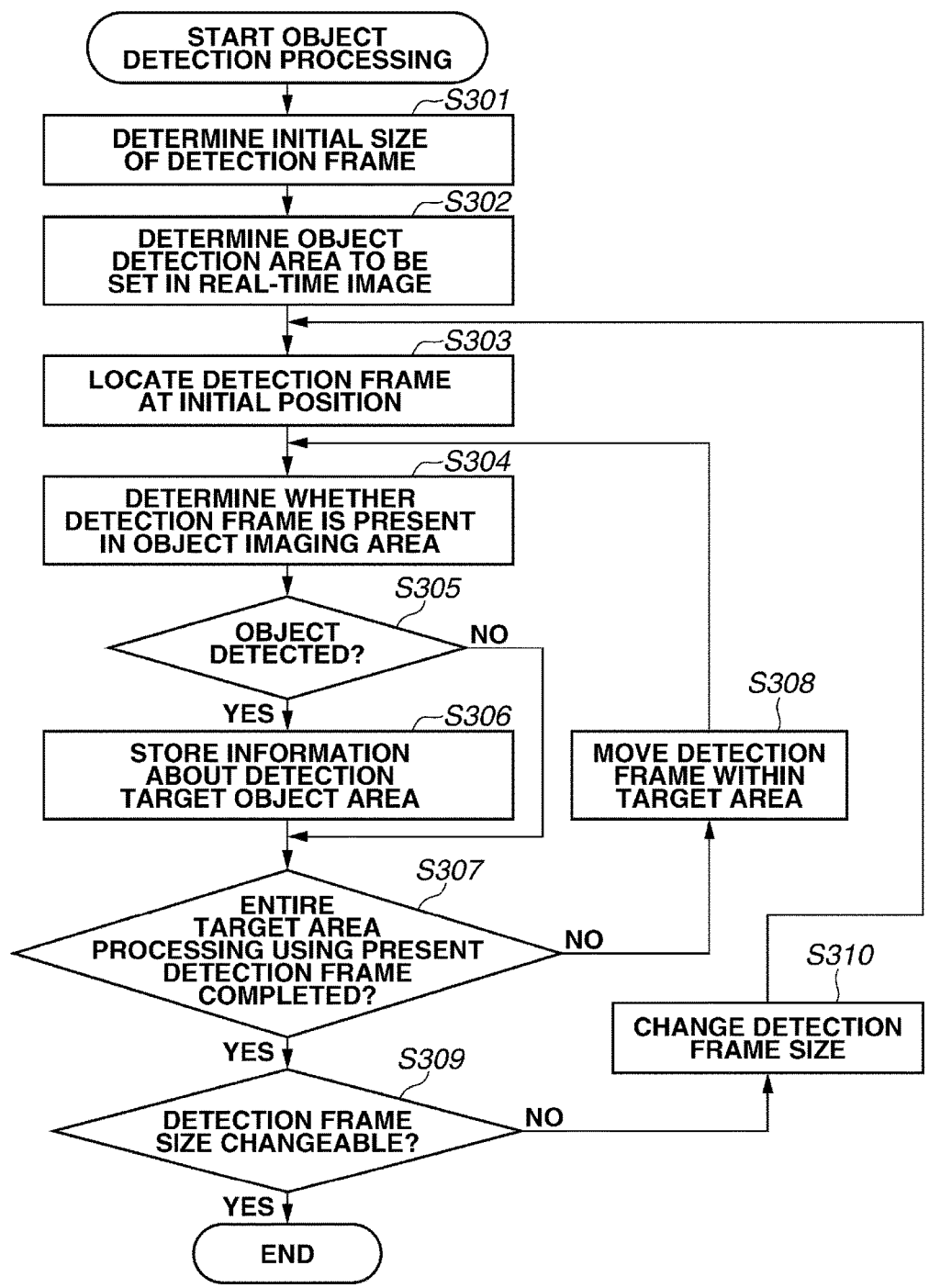

[Fig. 4A]
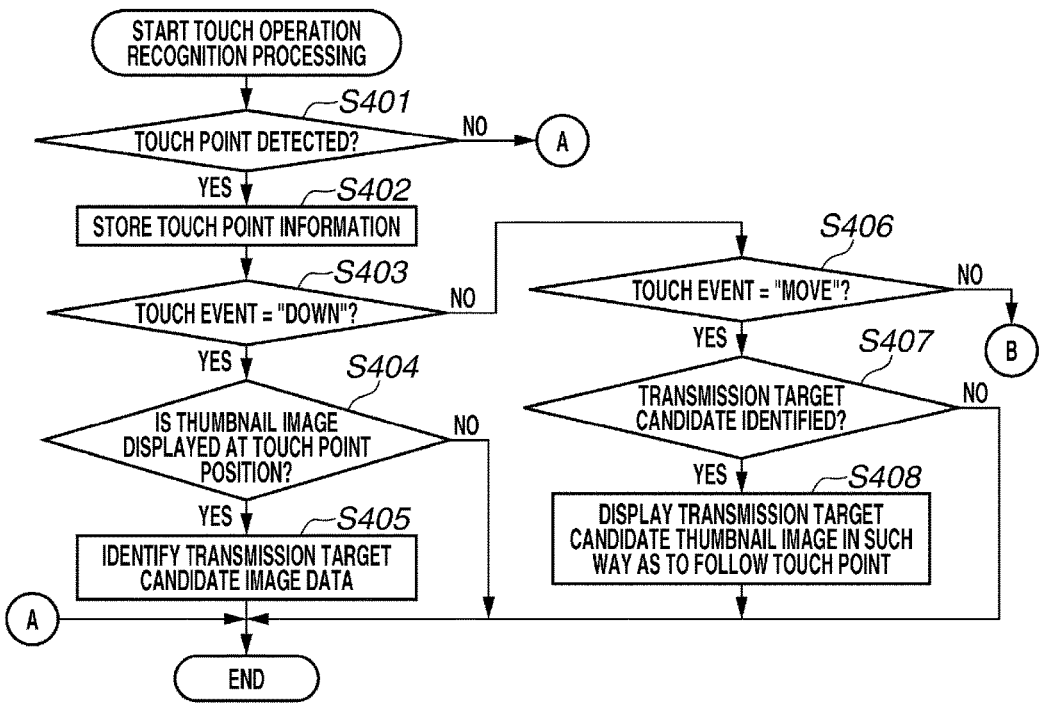
[Fig. 4B]
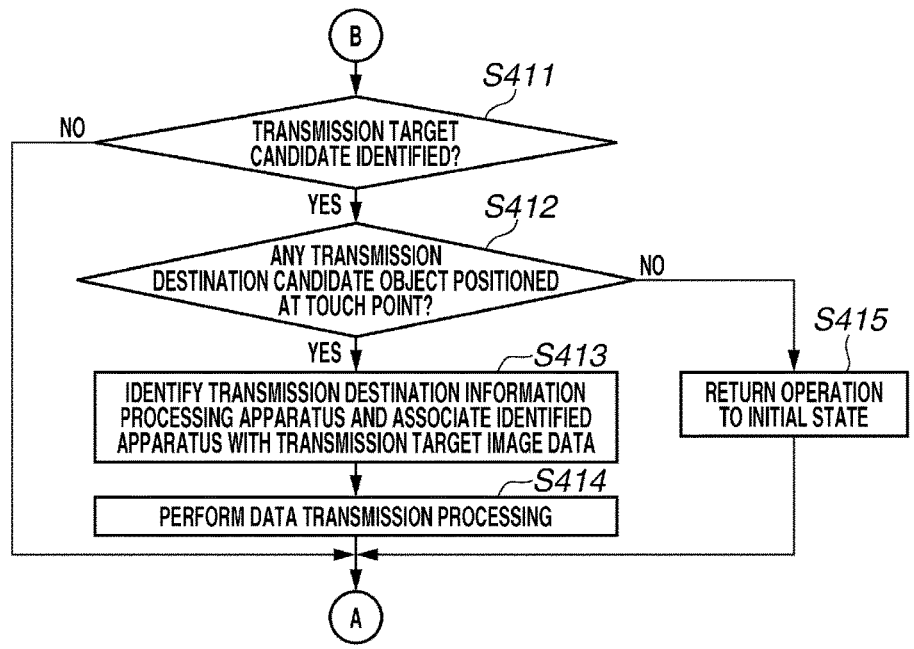

[Fig. 5]
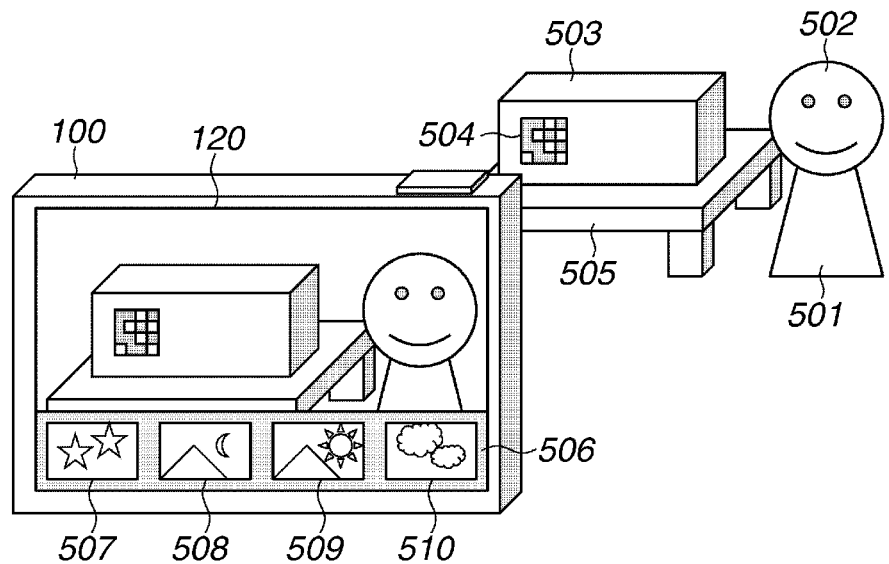
[Fig. 6A]
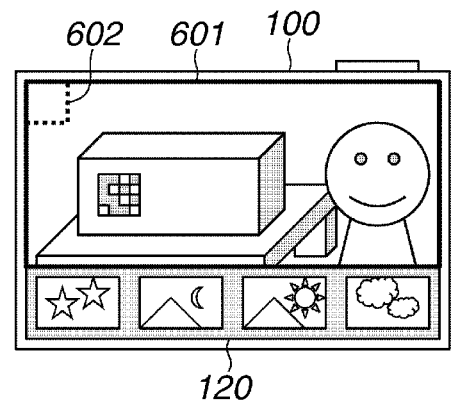
[Fig. 6B]
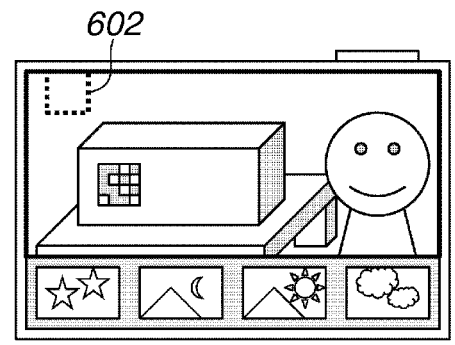

[Fig. 6C]
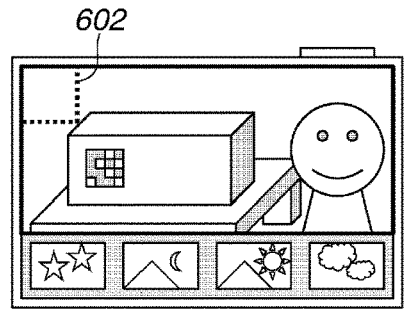
[Fig. 6D]
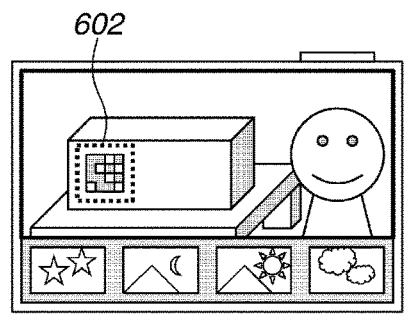
[Fig. 7A]
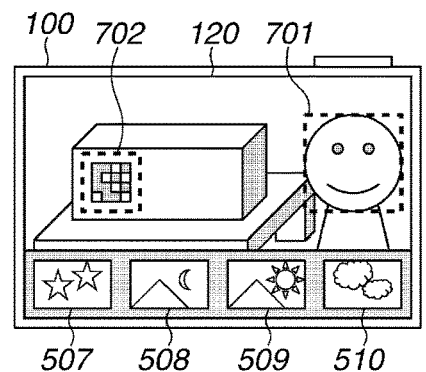
[Fig. 7B]
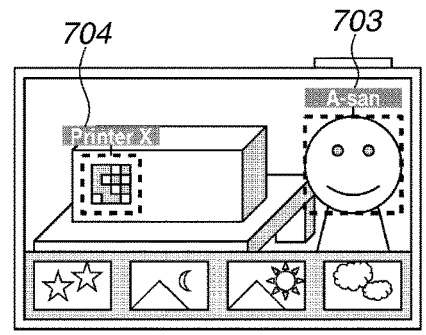

[Fig. 7C]
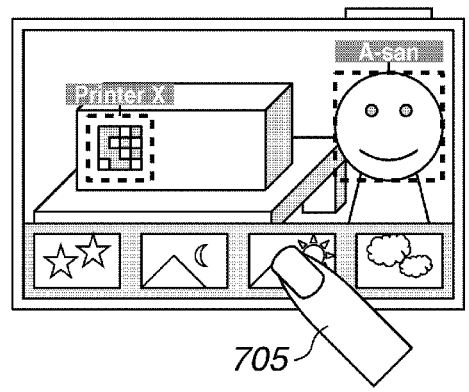
[Fig. 7D]
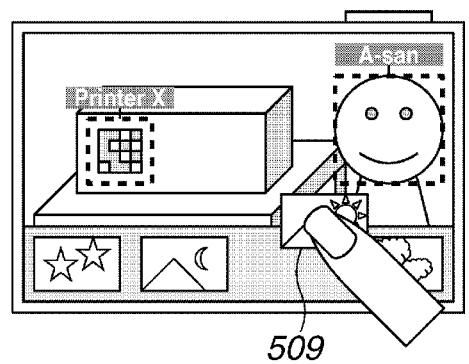
[Fig. 7E]
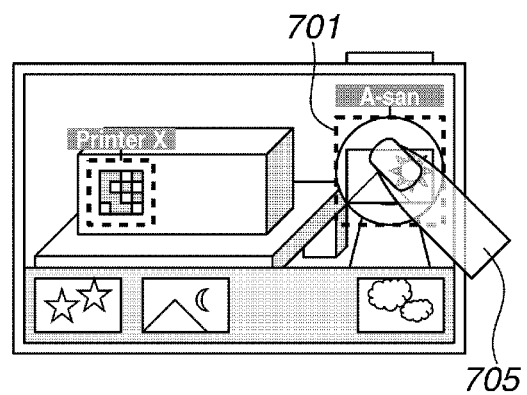

[Fig. 8A]
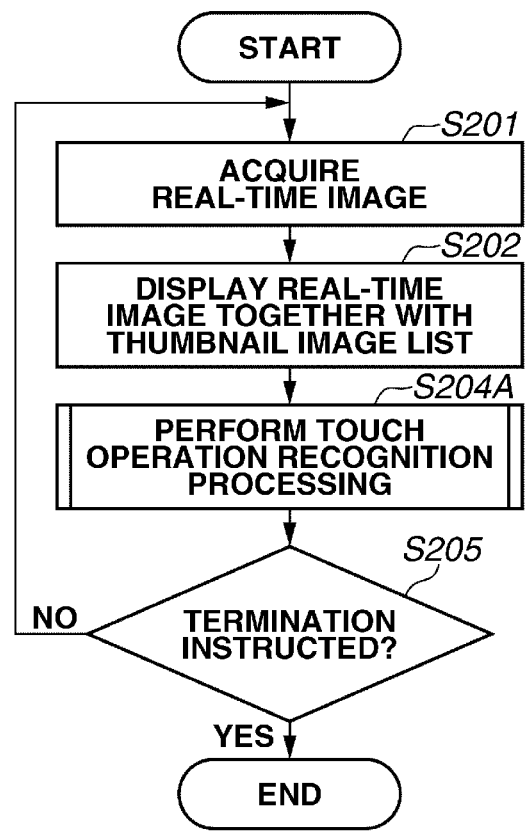

[Fig. 8B]
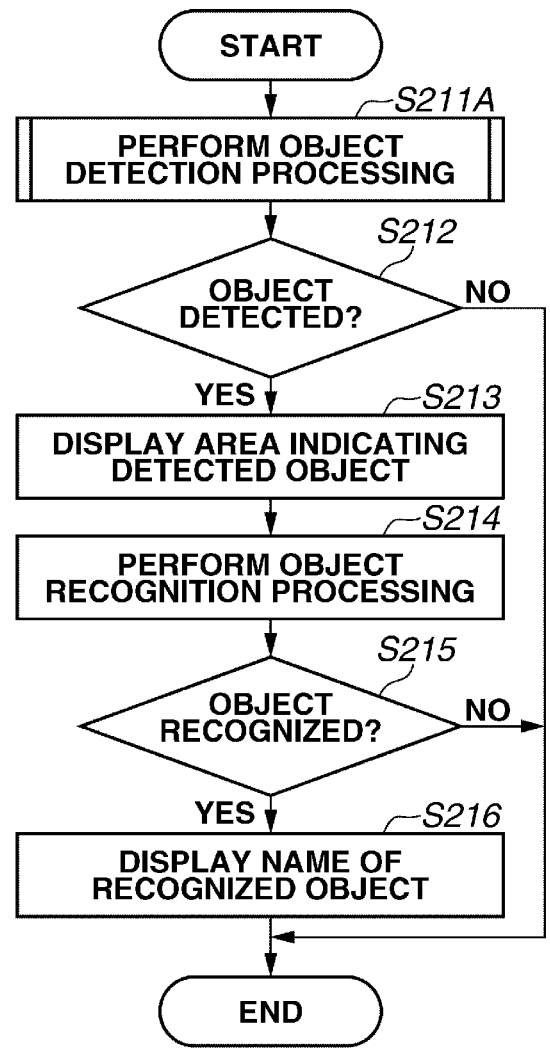

[Fig. 9A]
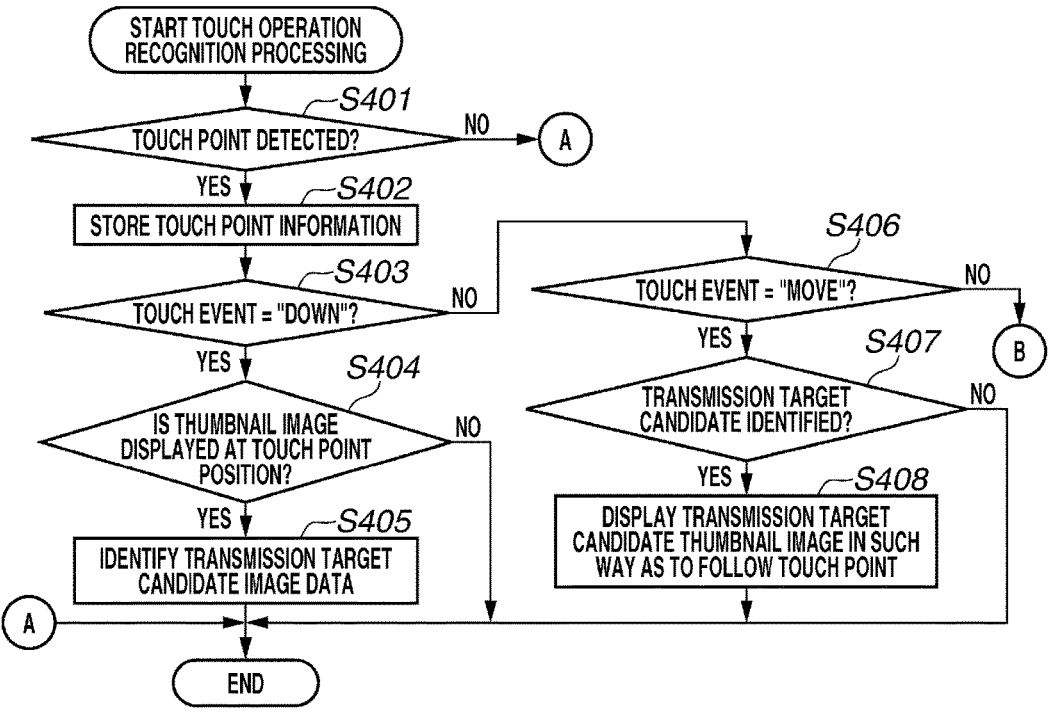
[Fig. 9B]
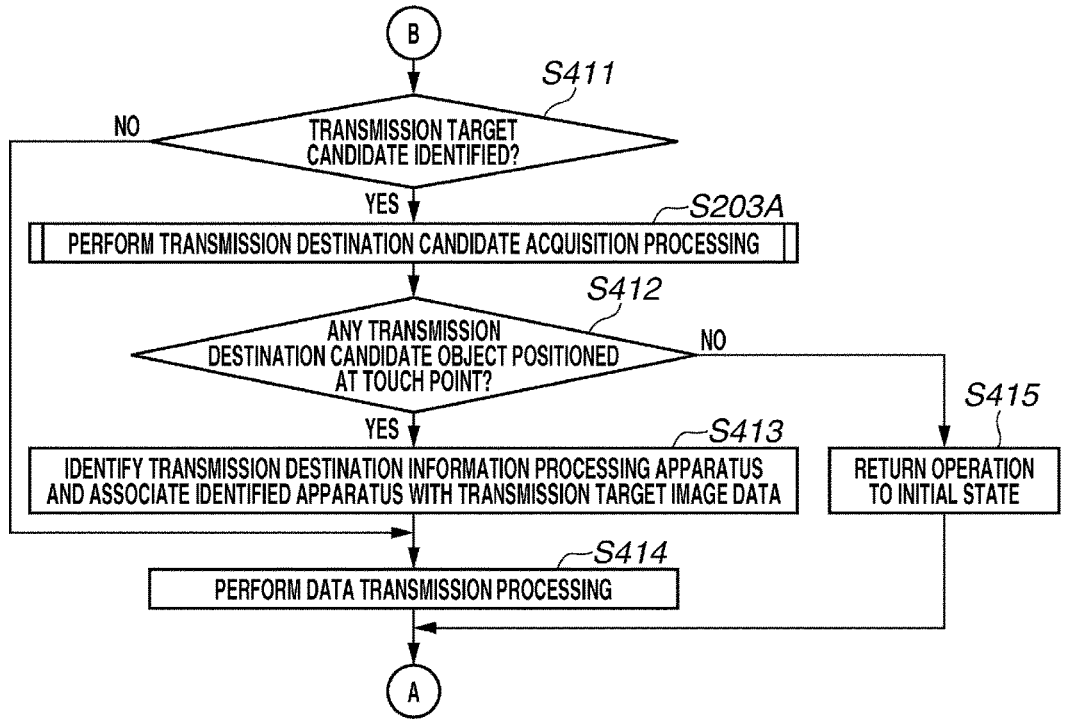

[Fig. 10A]
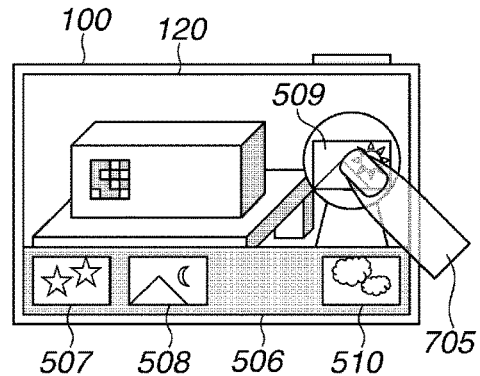
[Fig. 10B]
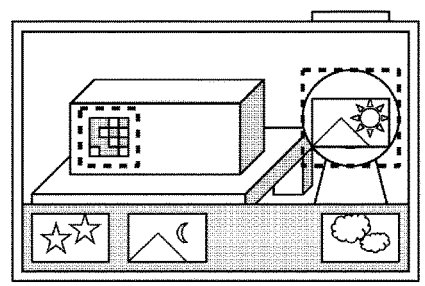
[Fig. 10C]
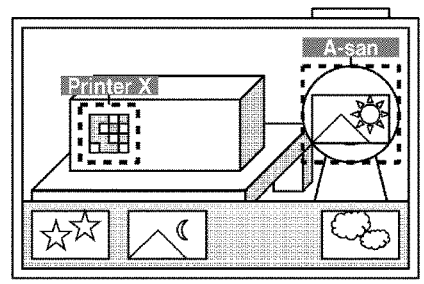
[Fig. 10D]
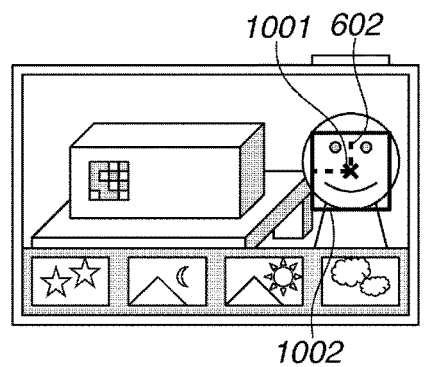

[Fig. 10E]
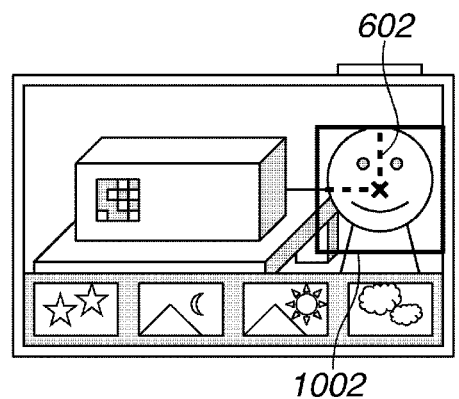
[Fig. 10F]
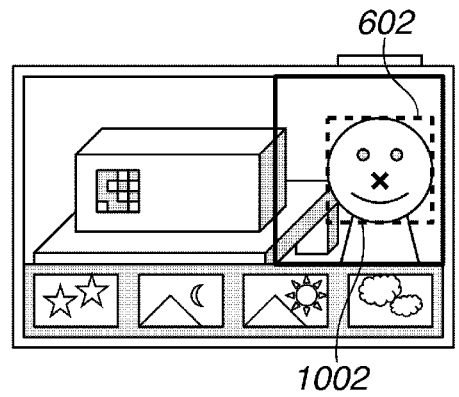

[Fig. 11]
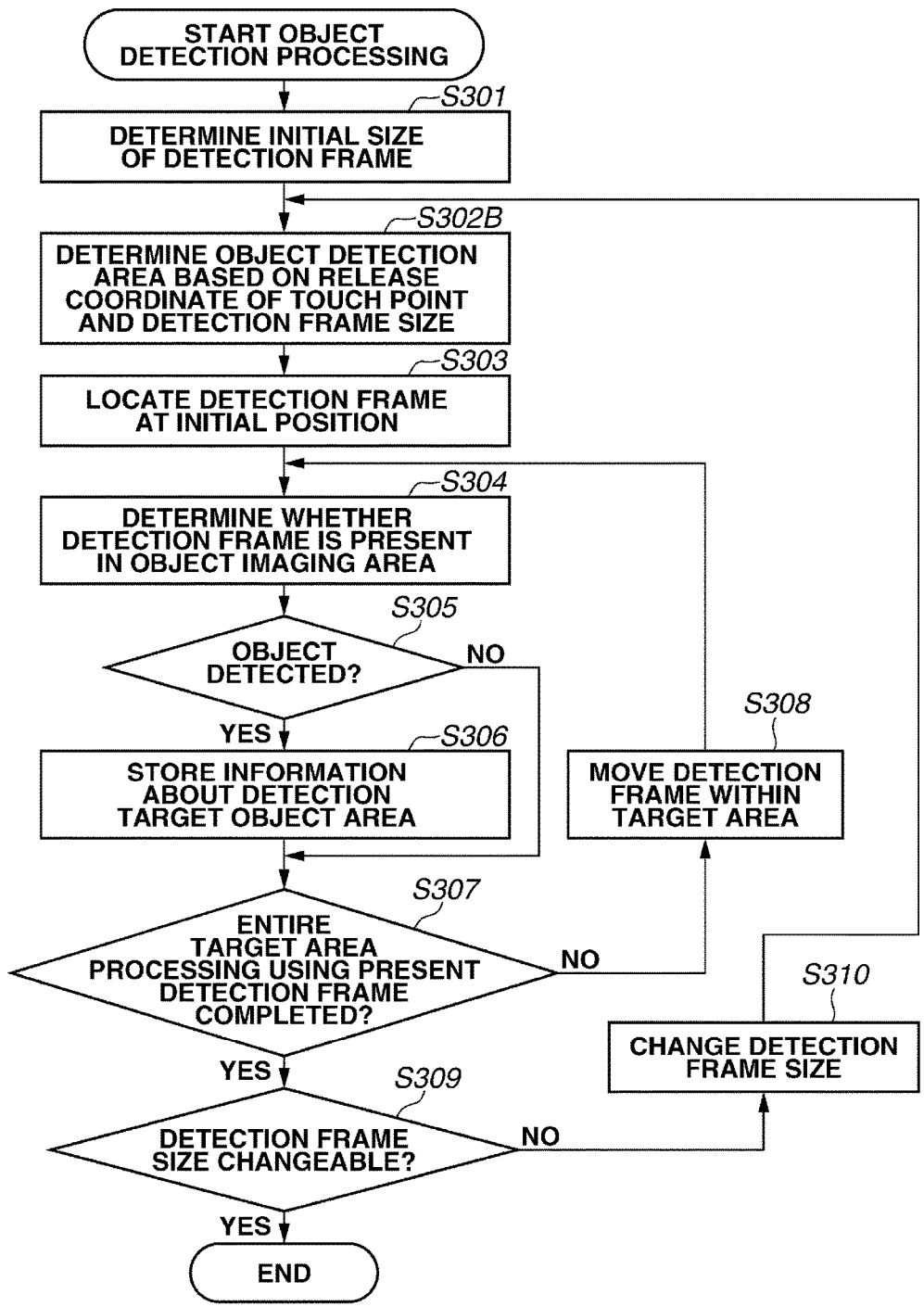

[Fig. 12A]
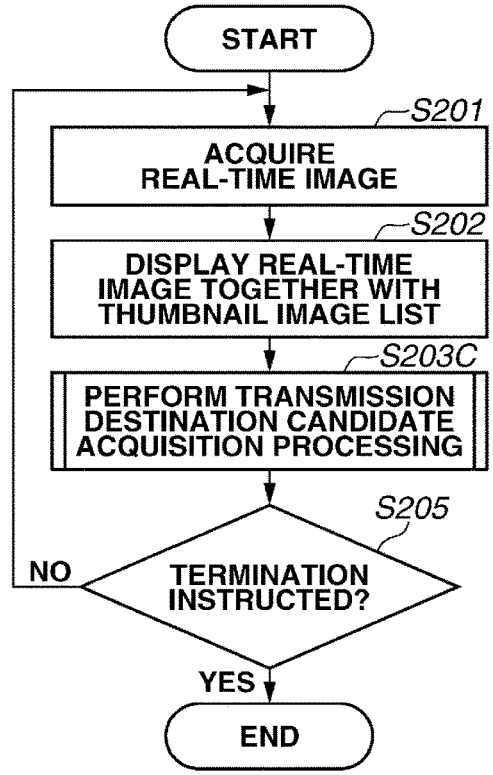
[Fig. 12B]
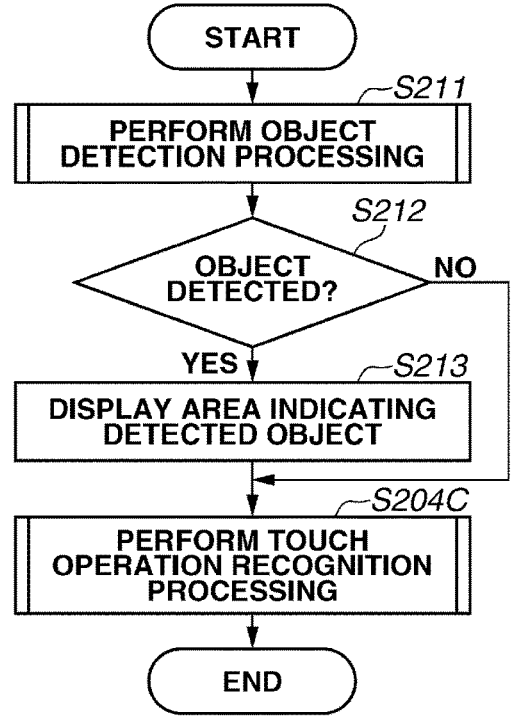

[Fig. 13A]
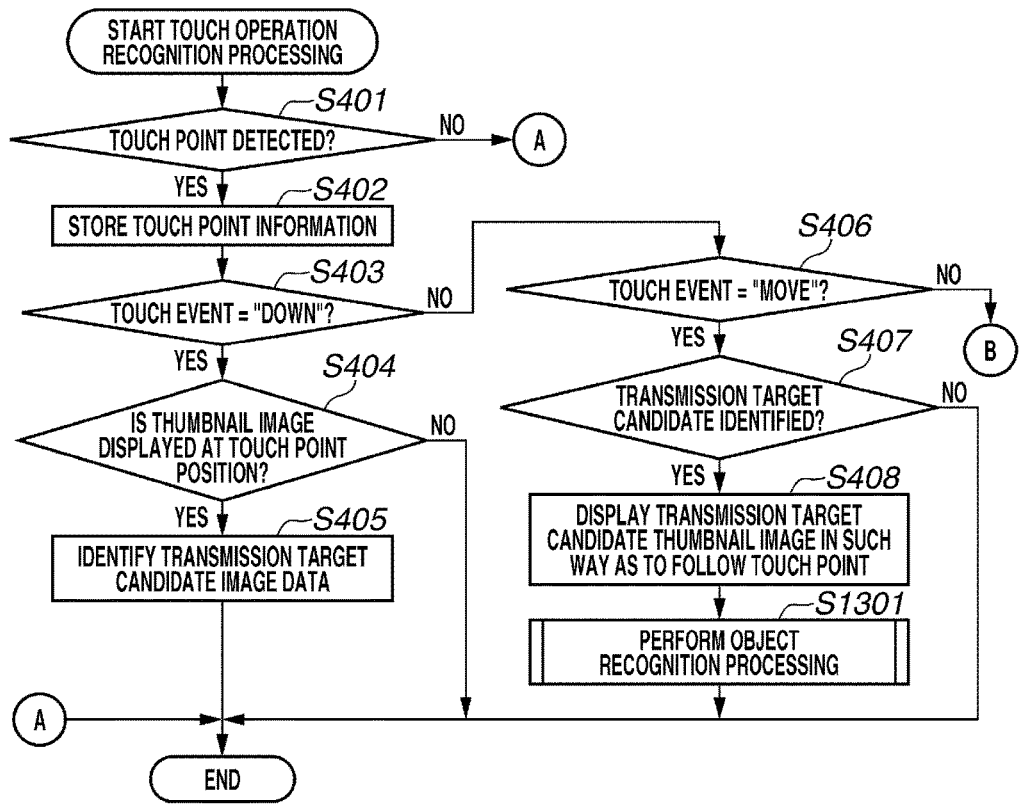
[Fig. 13B]
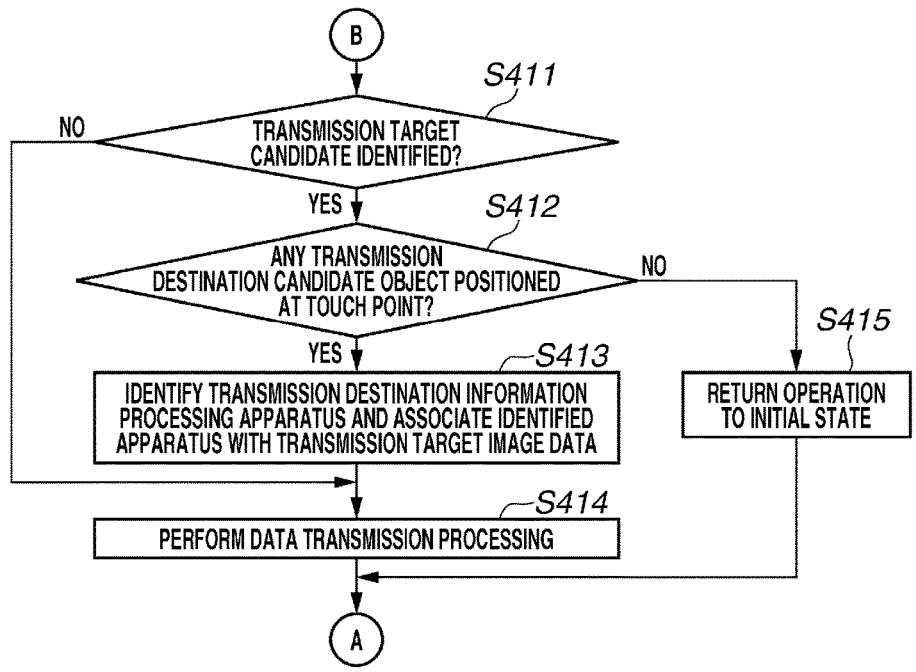

[Fig. 14A]
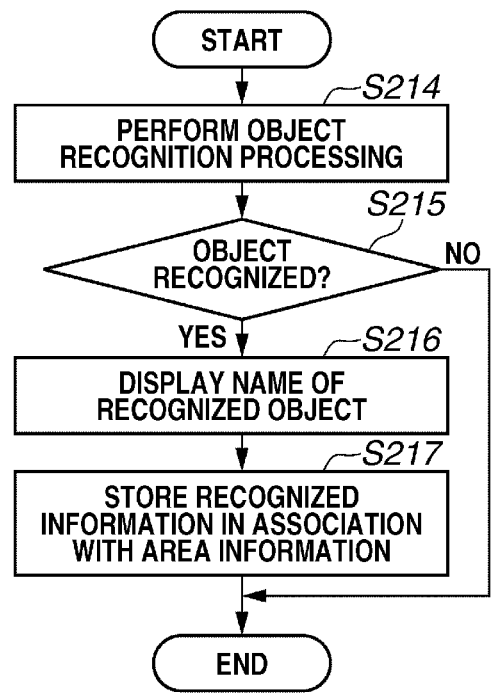

[Fig. 14B]
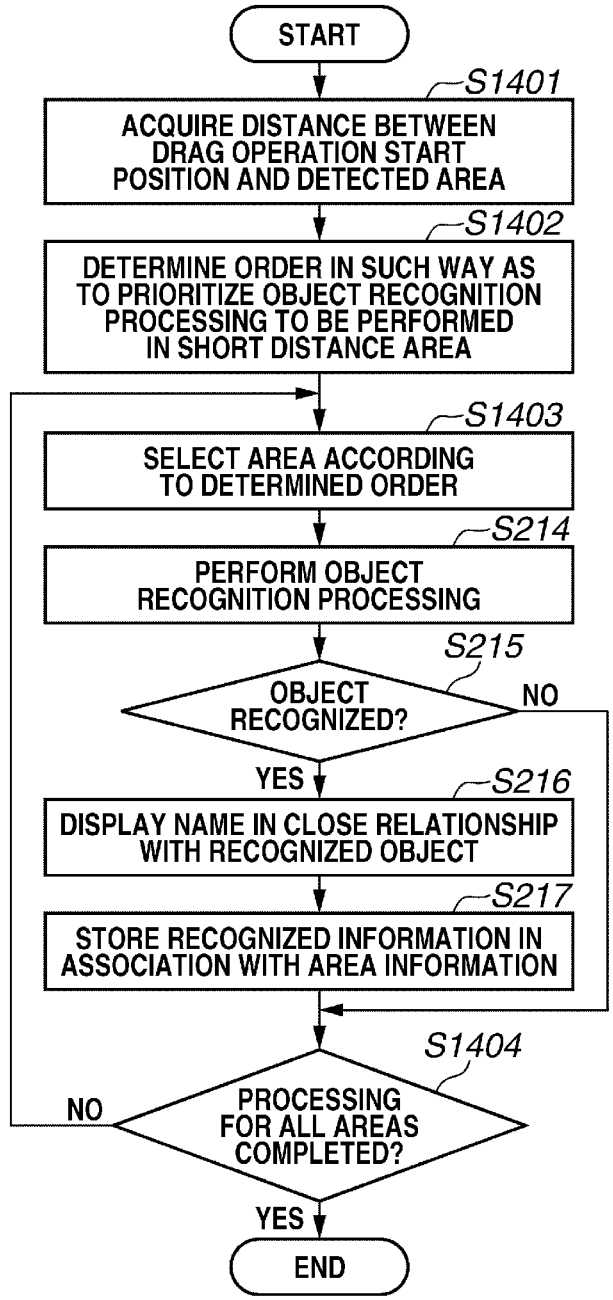

[Fig. 14C]
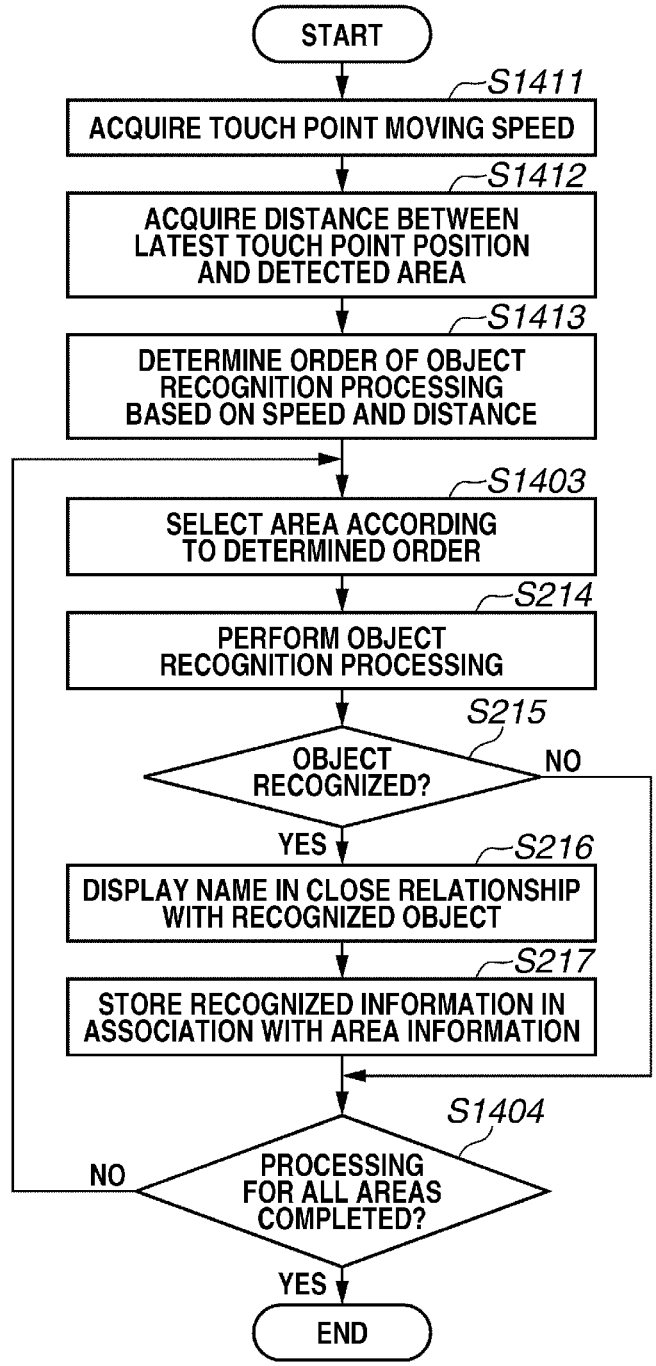

[Fig. 15A]
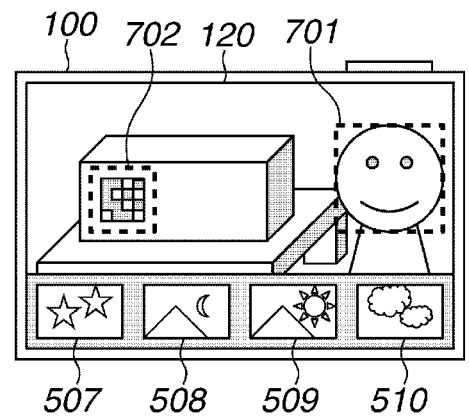
[Fig. 15B]
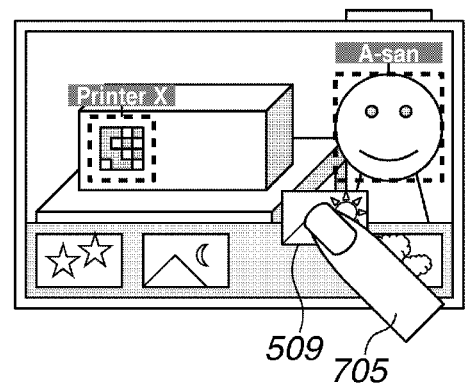
[Fig. 15C]
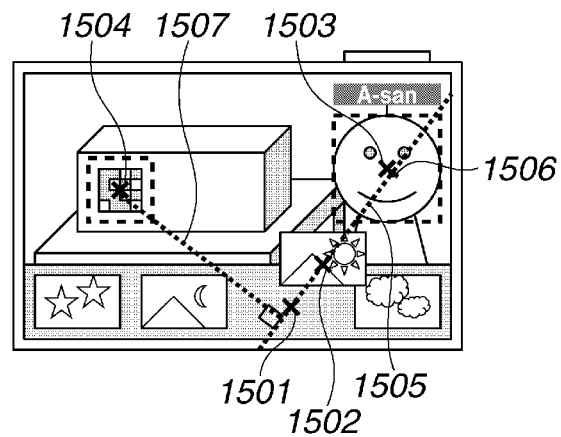

[Fig. 15D]
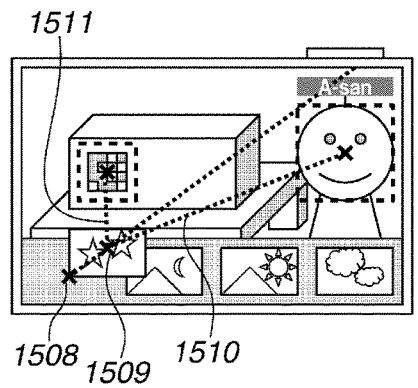
[Fig. 16A]
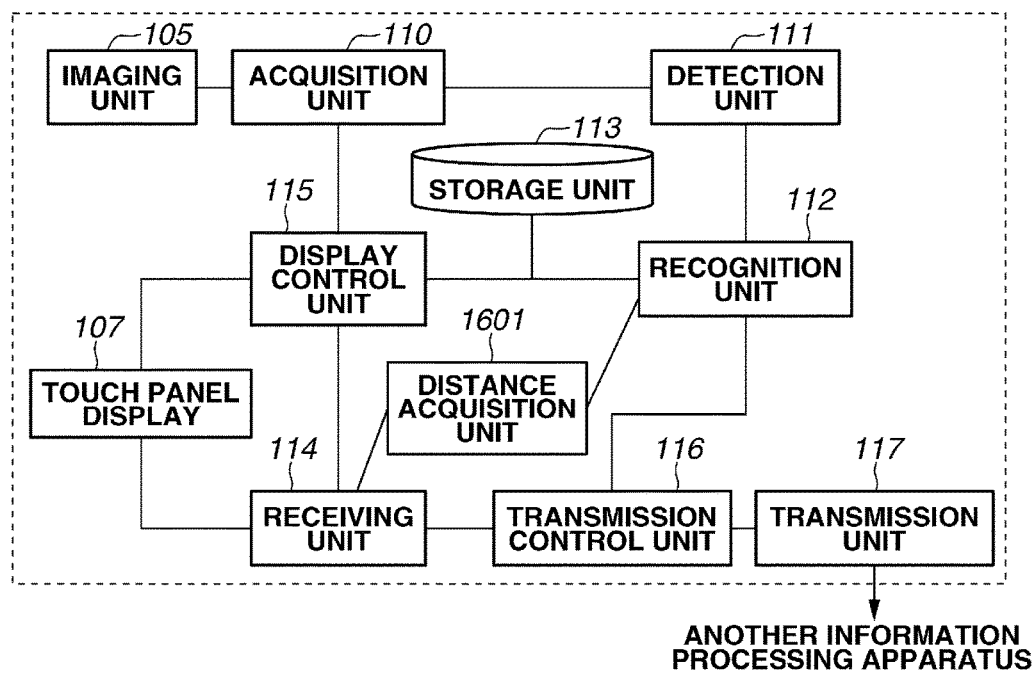

[Fig. 16B]
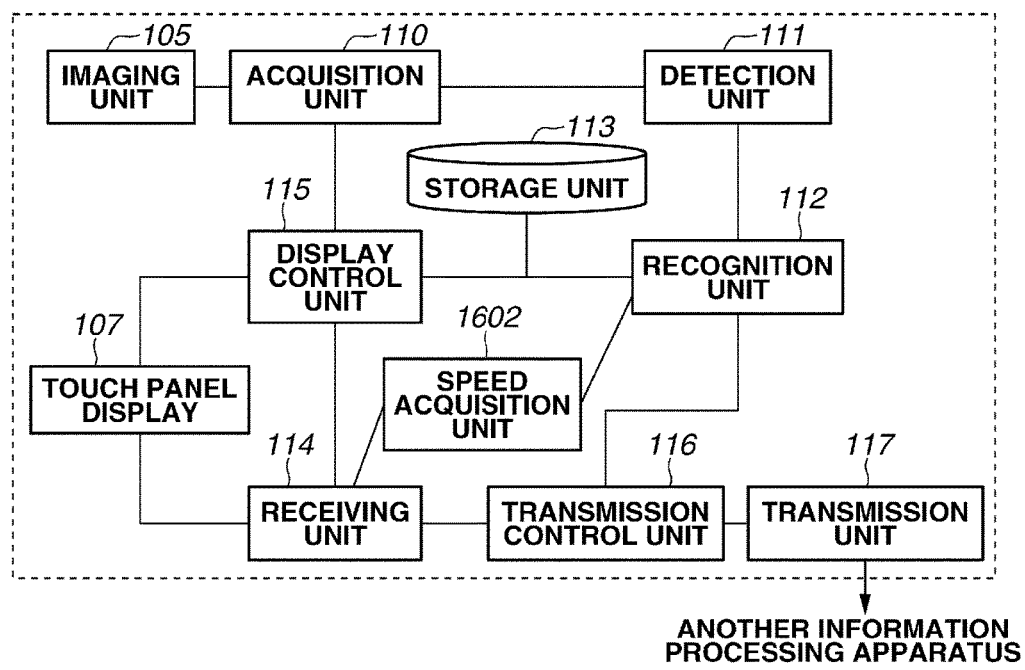

INFORMATION PROCESSING APPARATUS WHICH COOPERATE WITH OTHER APPARATUS, AND METHOD FOR CONTROLLING THE SAME

TECHNICAL FIELD

The present invention relates to a technique capable of enabling an information processing apparatus to transmit information to another information processing apparatus.

BACKGROUND ART

When a user wants to send data stored in an information device to another information device, it is conventionally known that the user transmits an email including the data to be transmitted as an attached file to an email address accessible to the destination (i.e., another information device). In general, when a user sends an email including transmission data, the user is required to specify a target email address among a plurality of email addresses stored in the information device and generate an email including attached data.

As discussed in Japanese Patent Application Laid-Open No. 2011-40865, in a case where a human photo is selected as an attached file, it is conventionally known to display an email address of a person who is a photographic subject of the photo as a transmission destination candidate.

According to the technique discussed in Japanese Patent Application Laid-Open No. 2011-40865, in a case where a user sends a photo to a person who is a photographic subject of the photo, the user can accomplish the work with a simple operation. On the other hand, if the data to be transmitted or received is a photo that does not include the transmission destination person or data other than the photo, a time-consuming work for identifying a target email address among a plurality of email addresses is still required.

Further, even in a case where a user sends data to a display apparatus to display an image or to a printing apparatus to output a printed product based on the data, the user is required to identify a transmission method and address information. If a user sends data to a person who is present closely according to the method discussed in Japanese Patent Application Laid-Open No. 2011-40865, the email address specifying work can be simplified by capturing a photo of the person. However, an email generated in this case may include an attached photo that is different from the data to be transmitted.

CITATION LIST

Patent Literature

PTL 1: Japanese Patent Application Laid-Open No. 2011-40865

SUMMARY OF INVENTION

The present invention is directed to a technique capable of improving the operability in transmitting information to someone existing closely or to an information processing apparatus.

According to an aspect of the present invention, an information processing apparatus is configured to transmit transmission target data to another information processing apparatus. The information processing apparatus includes a display control unit configured to display at least one object corresponding to the transmission target data together with a live view image on a display screen, and a receiving unit configured to receive an association operation for associating any one of the objects with any one of photographic subjects included in the live view image on the display screen. The information processing apparatus includes an identifying unit configured to identify another information processing apparatus associated beforehand with the photographic subject to be subjected to the association operation received by the receiving unit as a transmission destination to which the transmission target data corresponding to the object associated with the photographic subject is transmitted.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 1A is a block diagram illustrating a hardware configuration example of an information processing apparatus according to an exemplary embodiment.

FIG. 1B is a block diagram illustrating a functional configuration example of an information processing apparatus according to an exemplary embodiment.

FIG. 1C illustrates an appearance of the information processing apparatus.

FIG. 2A is a flowchart illustrating example processing that can be performed by the information processing apparatus to transmit image data to another information processing apparatus.

FIG. 2B is a flowchart illustrating example processing that can be performed by the information processing apparatus to acquire information of the transmission destination candidate.

FIG. 3 is a flowchart illustrating an example of object detection processing that can be performed by the information processing apparatus.

FIG. 4A is a flowchart illustrating an example of touch operation recognition processing that can be performed by the information processing apparatus.

FIG. 4B is a flowchart illustrating an example of touch operation recognition processing that can be performed by the information processing apparatus.

FIG. 5 illustrates a schematic relationship between the state of each photographic subject that is present in front of a user holding the information processing apparatus that can be operated by the user to capture an image including the photographic subjects.

FIG. 6A illustrates an example of processing that can be performed by the information processing apparatus to detect an area in which a detection target object is present.

FIG. 6B illustrates an example of processing that can be performed by the information processing apparatus to detect an area in which a detection target object is present.

FIG. 6C illustrates an example of processing that can be performed by the information processing apparatus to detect an area in which a detection target object is present.

FIG. 6D illustrates an example of processing that can be performed by the information processing apparatus to detect an area in which a detection target object is present.

FIG. 7A illustrates an example display that can be presented on a display screen of the information processing apparatus.

FIG. 7B illustrates an example display that can be presented on a display screen of the information processing apparatus.

FIG. 7C illustrates an example display that can be presented on a display screen of the information processing apparatus.

FIG. 7D illustrates an example display that can be presented on a display screen of the information processing apparatus.

FIG. 7E illustrates an example display that can be presented on a display screen of the information processing apparatus.

FIG. 8A is a flowchart illustrating example processing that can be performed by the information processing apparatus to transmit image data to another information processing apparatus.

FIG. 8B is a flowchart illustrating example processing that can be performed by the information processing apparatus to transmit image data to another information processing apparatus.

FIG. 9A is a flowchart illustrating an example of touch operation recognition processing that can be performed by the information processing apparatus.

FIG. 9B is a flowchart illustrating an example of touch operation recognition processing that can be performed by the information processing apparatus.

FIG. 10A illustrates an example display that can be presented on the display screen when the information processing apparatus performs processing for detecting an area in which a detection target object is present.

FIG. 10B illustrates an example display that can be presented on the display screen when the information processing apparatus performs processing for detecting an area in which a detection target object is present.

FIG. 10C illustrates an example display that can be presented on the display screen when the information processing apparatus performs processing for detecting an area in which a detection target object is present.

FIG. 10D illustrates an example display that can be presented on the display screen when the information processing apparatus performs processing for detecting an area in which a detection target object is present.

FIG. 10E illustrates an example display that can be presented on the display screen when the information processing apparatus performs processing for detecting an area in which a detection target object is present.

FIG. 10F illustrates an example display that can be presented on the display screen when the information processing apparatus performs processing for detecting an area in which a detection target object is present.

FIG. 11 is a flowchart illustrating an example of object detection processing that can be performed by the information processing apparatus.

FIG. 12A is a flowchart illustrating example processing that can be performed by the information processing apparatus to transmit image data to another information processing apparatus.

FIG. 12B is a flowchart illustrating example processing that can be performed by the information processing apparatus to transmit image data to another information processing apparatus.

FIG. 13A is a flowchart illustrating an example of touch operation recognition processing that can be performed by the information processing apparatus.

FIG. 13B is a flowchart illustrating an example of touch operation recognition processing that can be performed by the information processing apparatus.

FIG. 14A is a flowchart illustrating an example of the object recognition processing that can be performed by the information processing apparatus.

FIG. 14B is a flowchart illustrating an example of the object recognition processing that can be performed by the information processing apparatus.

FIG. 14C is a flowchart illustrating an example of the object recognition processing that can be performed by the information processing apparatus.

FIG. 15A illustrates a specific example display on the display screen when the information processing apparatus performs processing for detecting an area in which a detection target object is present.

FIG. 15B illustrates a specific example display on the display screen when the information processing apparatus performs processing for detecting an area in which a detection target object is present.

FIG. 15C illustrates a specific example display on the display screen when the information processing apparatus performs processing for detecting an area in which a detection target object is present.

FIG. 15D illustrates a specific example display on the display screen when the information processing apparatus performs processing for detecting an area in which a detection target object is present.

FIG. 16A is a block diagram illustrating a functional configuration of the information processing apparatus.

FIG. 16B is a block diagram illustrating a functional configuration of the information processing apparatus.

DESCRIPTION OF EMBODIMENTS

Various exemplary embodiments, features, and aspects of the invention will be described in detail below with reference to the drawings. However, constituent elements described in the following exemplary embodiment are mere examples. The present invention is not limited to only the constituent elements described below.

An information processing apparatus (i.e., own apparatus) according to a first exemplary embodiment includes an imaging unit (e.g., a camera) and can transmit data stored in the own apparatus to one of a plurality of information processing apparatuses (another apparatus) detected in a real-time video captured by the imaging unit, as described in detail below.

FIG. 1A illustrates an example of a hardware configuration of an information processing apparatus 100 according to the present exemplary embodiment. A central processing unit (CPU) 101 is configured to perform calculations and logical determinations in various processing and control each constituent element connected to a system bus 130. The information processing apparatus 100 includes various memories. A read-only memory (ROM) 102 is a program memory, which stores programs required when the CPU 101 performs various processing and controls.

A random access memory (RAM) 103 is a data memory, which includes a work area usable when the CPU 101 executes the above-mentioned program, a data save area usable in the event of error processing, and a loading area usable when the above-mentioned control program is loaded. Alternatively, it is useful to realize the program memory by loading a program from an external storage device to the RAM 103.

A hard disk (HD) 104 can store various data and programs relating to the present exemplary embodiment. In the present exemplary embodiment, the data stored in the HD 104 includes electronic data (e.g., image data and document data). An external storage device is usable if it has similar capability. In the present exemplary embodiment, the external storage device is a server apparatus (e.g., a cloud server) that is accessible via a network interface 108. However, for example, the external storage device can be constituted by a recording medium and an external storage drive that can realize an access to the recording medium. The above-mentioned recording medium is, for example, a flexible disk (FD), a compact disc read-only memory (CD-ROM), a digital versatile disk (DVD), a universal serial bus (USB) memory, a magneto-optical disk (MO), or a flash memory.

Information required in the present exemplary embodiment is stored in the RAM 103, the HD 104, or the external storage device. An imaging unit 105 includes an imaging optical system including a lens, an image sensor such as a complementary metal oxide semiconductor (CMOS) sensor, and a signal processing circuit. More specifically, an optical image of a photographic subject formed on an imaging plane of a light-receiving element is input, as image information, to the information processing apparatus 100. The image sensor converts the optical image into an analog electric signal.

The analog electric signal is then converted into a digital signal (i.e., digital data) through analog-digital (A/D) conversion processing and is sent to the information processing apparatus 100. In the present exemplary embodiment, the information processing apparatus 100 performs image processing (e.g., object detection processing and recognition processing described below) on the image information having been input as the digital signal. The input digital signal is written into an image display memory (VRAM) 106 and then converted into an analog signal through digital-analog (D/A) conversion processing. The analog signal is then output to a touch panel display device 107 (i.e., a display unit according to the present exemplary embodiment).

As mentioned above, an electric signal can be formed based on a captured optical image and then stored in an image display memory through A/D conversion processing. Each digital signal is converted into an analog signal through D/A conversion processing and transferred to the display unit. The display unit successively displays an image based on the received analog signal. In this respect, the display unit is functionally operable as an electronic view finder that can realize the display of a live view image.

A real-time video captured by the imaging unit 105 and successively updated and displayed without being stored as an image file, as mentioned above, is generally referred to as "live view image" or "live view video."

The touch panel display device 107 is functionally operable as a pointing device (including a touch sensor) that can obtain information about a user's operation performed in a touch target area. Further, the touch panel display device 107 is functionally operable as a display device including a display area in which an image can be displayed. In the present exemplary embodiment, the touch target area and the display area of the display device are identical in size and completely superposed on each other.

In the present exemplary embodiment, the touch panel display device 107 integrated with the information processing apparatus 100 serves as the touch panel (i.e., an input apparatus) and the display device (i.e., an output apparatus). However, the touch panel display device 107 can be replaced by an external apparatus connected to the information processing apparatus 100. The touch panel display device 107, serving as an input apparatus according to the present exemplary embodiment, is an electrostatic capacitive touch panel display device.

Further, in the present exemplary embodiment, the touch panel display device 107 is operable according to a normal mode or a high-sensitivity mode. In the normal mode, the touch panel display device 107 scans an operation surface with the touch sensor to detect a point touched by a user and notifies the information processing apparatus 100 of a touch event indicating each detection of a touch point or a released touch point.

On the other hand, in the high-sensitivity mode, the touch panel display device 107 can detect an approaching finger as a touch point even when the finger is not yet brought into contact with the surface thereof because the sensitivity of the touch sensor is high. In the present exemplary embodiment, the imaging unit 105 and the touch panel display device 107 are integrated with the information processing apparatus 100. Alternatively, the imaging unit 105 and the touch panel display device 107 can be constituted as external devices or independent devices.

The touch panel employed in the present exemplary embodiment is the electrostatic capacitive type, as described above. However, the touch panel is not limited to the electrostatic capacitive type. For example, a pressure-sensitive touch panel or an optical touch panel is employable. The network interface 108 is connected to another information processing apparatus or an external storage device via a wired or wireless network, according to a conventional communication technique, to realize bidirectional transmission and reception of information. In the present exemplary embodiment, the information processing apparatus 100 can communicate with an external device via a wireless local area network (LAN). The information processing apparatus 100 can directly communicate or indirectly communicate (e.g., via a relay apparatus) with another information processing apparatus.

FIG. 1B is a block diagram illustrating an example of a functional configuration of the information processing apparatus 100. An acquisition unit 110, which can be constituted by the CPU 101, the ROM 102, and the RAM 103, is configured to acquire image information captured by the imaging unit 105. In the present exemplary embodiment, the acquisition unit 110 acquires a digital signal of image information as mentioned above. The acquisition unit 110 acquires information about a still image corresponding to one frame of a video continuously captured by the imaging unit 105 (hereinafter, referred to as "real-time image"). Then, the acquisition unit 110 writes the acquired information into the VRAM 106 to display a live view image. Further, the acquisition unit 110 stores the acquired information in the RAM 103 as a processing target of a detection unit 111 or a recognition unit 112 as described below. In the present exemplary embodiment, the acquisition unit 110 can acquire one real-time image for each frame or for a predetermined number of frames (at predetermined time intervals).

The detection unit 111, which can be constituted by the CPU 101, the ROM 102, and the RAM 103, is configured to detect an area including a target object (i.e., an object that belongs to a type being set beforehand as a detection target) as a photographic subject from an image periodically acquired by the acquisition unit 110. The object type that can be detected by the information processing apparatus 100 is, for example, human face, two-dimensional bar code, and marker (that may be characteristic in color and shape).

In the present exemplary embodiment, detection targets having being set beforehand for the information processing apparatus 100 are human face and two-dimensional bar code. The detection unit 111 searches an image acquired by the acquisition unit 110 to detect an area including a detection target (i.e., a human face or a two-dimensional bar code). If a detection target area is detected, the detection unit 111 stores information indicating the detected area in the RAM 103.

The recognition unit 112, which can be constituted by the CPU 101, the ROM 102, and the RAM 103, is configured to recognize information identifying an object detected by the detection unit 111 based on image information of the detected object. More specifically, in a case where the detected object is a human face, the recognition unit 112 identifies the captured person based on a comparison between face features obtainable from a face area notified by the detection unit 111 and human face feature information having been stored beforehand, with reference to information stored in a storage unit 113. Then, the recognition unit 112 stores the recognition result (including person's registered name and person's email address) and face area position information in the RAM 103 while associating them with other.

Further, in a case where the detected object is a two-dimensional bar code, the recognition unit 112 analyzes the bar code information and stores the obtained information together with positional information about an area in which the two-dimensional bar code has been detected or an area including an object to which the two-dimensional bar code is attached in the RAM 103 while associating them with each other. In the present exemplary embodiment, two-dimensional bar code information includes information about a transmission method, address information (e.g., IP address or email address) indicating a transmission destination, and control information about processing to be performed by the transmission destination information processing apparatus.

The storage unit 113, which corresponds to the HD 104 or the external storage device, is configured to store information about a corresponding relationship between human face and name or email address that is necessary to perform processing according to the present exemplary embodiment and electronic data (e.g., image data and document data).

A receiving unit 114, which can be constituted by the CPU 101, the ROM 102, and the RAM 103, is configured to receive information notified from the touch panel display device 107. More specifically, the receiving unit 114 receives information about a touch point detectable when a user has touched the touch target area of the touch panel display device 107.

The touch point information includes coordinate information about a touch point position and information about a touch event type. In the present exemplary embodiment, the touch event notified from the input interface 105 is any one of three events, i.e., a "DOWN" event indicating that a touch operation has started, a "MOVE" event indicating that a finger or a stylus has moved while keeping a touch state, and an "UP" event indicating that the touch point has been released. The receiving unit 114 stores the received touch point information in the RAM 103.

In the present exemplary embodiment, the information processing apparatus 100 discriminates a touch operation performed by a user based on touch point coordinate values and touch event information received by the receiving unit 114 and controls each functional unit to generate an output according to each operation. For example, if a "DOWN" event and an "UP" event are sequentially detected before the movement of a touch point exceeds a predetermined distance, the information processing apparatus 100 outputs a detection result concluding that the detected touch point movement is a tap operation. The tap operation is an operation causing a finger to be released from a touch start position without moving in the target area, which is frequently used when a user selects or designates a displayed item.

Further, for example, if at least one "MOVE" event is detected before an "UP" event is detected after a "DOWN" event is detected, the information processing apparatus 100 outputs a detection result concluding that the detected touch point movement is a drag operation. The drag operation is an operation causing a finger to move by a significant distance while continuously touching the target area, which is frequently used when a user moves an object displayed at a touch start position. In general, if a user touches an object whose size in a displayed state is smaller than the display area and performs a drag operation from a touch start position to a target position before releasing a finger from the panel, the user's operation is referred to as a drag and drop operation. Further, the position where the finger has been released is referred to as a drop position.

In the drag and drop operation, the object displayed at the coordinate position where a "DOWN" event has been detected is moved to the coordinate position where an "UP" event has been detected. Further, if the moving speed of the touch point is equal to or greater than a predetermined threshold value in a "MOVE" event detected immediately before an "UP" event is detected, the information processing apparatus 100 outputs a detection result concluding that the detected touch point movement is a flick operation. The flick operation is an operation causing a finger to be released from the target area while being flicked in a user's intended direction, which is frequently used when a user moves an intended one of a plurality of targets forward or backward according to a predetermined display order.

A display control unit 115, which can be constituted by the CPU 101, the ROM 102, the RAM 103, and the VRAM 106, is configured to generate display images to be output to the touch panel display device 107 and control display contents. The display control unit 115 according to the present exemplary embodiment can generate display images in such a way as to display a live view image together with thumbnail images of the image data stored in the storage unit 113. For example, two images can be simultaneously displayed in two divided display areas. Further, the display control unit 115 can generate display images in such a way as to generate a display image reflecting a user's operation based on touch point information received by the receiving unit 114.

For example, in a case where a "DOWN" event is detected when a user touches a position where a thumbnail image is displayed, the display control unit 115 controls a display image in such a way as to cause the thumbnail image to follow up the touch point movement until it reaches a position where a "MOVE" event is detected. For example, the display control unit 115 can fully display image data corresponding to a thumbnail image in the entire display area if it is selected by a tap operation. Further, the display control unit 115 can change a thumbnail image to be displayed in the display area according to a flick operation input in an area where a thumbnail image is displayed.

A transmission control unit 116, which can be constituted by the CPU 101, the ROM 102, and the RAM 103, is configured to identify transmission target data to be transmitted to another information processing apparatus and a transmission destination information processing apparatus while associating them with each other. In the present exemplary embodiment, the transmission control unit 116 identifies the transmission target data and the transmission destination information processing apparatus based on a movement caused when a user performs a drag and drop operation to move a thumbnail image.

The drag and drop operation performed to move a thumbnail image is intuitive and similar to a human conduct performed when a photo is presented to someone or to a printer in the real world. As a practical example, image data corresponding to a thumbnail image displayed at the position where the receiving unit 114 has received a "DOWN" event can be identified as the transmission target data.

Further, the transmission destination information processing apparatus can be identified based on a relationship between the position where the receiving unit 114 has received the "UP" event and the area detected by the detection unit 111. The transmission control unit 116 stores the transmission target data and the transmission destination information while associating them with each other and notifies a transmission unit 117 of the stored data.

The transmission unit 117, which can be constituted by the CPU 101, the ROM 102, the RAM 103, and the network interface 108, is configured to transmit the transmission target data identified by the transmission control unit 116 to the identified transmission destination. An appropriate conventional technique is usable to perform transmission processing. For example, if the identified transmission destination information is an email address, the transmission unit 117 generates an email including the identified data attached thereto and transmits the generated email. If the identified transmission destination information is an IP address, the transmission unit 117 transmits the identified data to an information processing apparatus having the identified IP address via a wireless LAN.

Each of the above-mentioned functional units can be realized by software processing performed by the information processing apparatus 100. However, at least a part of the above-mentioned functional configuration can be constituted by a hardware arrangement. In this case, it is useful to replace the above-mentioned functional unit by a comparable calculation unit or circuit.

FIG. 1C illustrates an external appearance of the information processing apparatus 100 according to the present exemplary embodiment. In the present exemplary embodiment, the information processing apparatus 100 has a surface on which a display screen 120 (including a touch target area superposed with a display area) is provided and another surface on which a lens unit 121 (i.e., a part of an optical system of the imaging unit 105) is provided. Accordingly, a user can visually recognize a captured real-time video on the display screen 120 while directing the lens unit 121 toward an actual photographic subject. A shutter button 122 and a user interface displayed on the display screen 120 are operable to capture a still image or a moving image and store the captured data.

Next, example processing that can be performed by the CPU 101 according to a program loaded into the RAM 103 according to the present exemplary embodiment is described in detail below with reference to flowcharts illustrated in FIGS. 2 and 4.

FIG. 2A is a flowchart illustrating an example of processing that can be performed by the information processing apparatus 100 to transmit image data to another information processing apparatus. In the present exemplary embodiment, if the information processing apparatus 100 starts processing for transmitting data stored in the storage unit 113 in response to a mode selection or an application startup, the CPU 101 starts the following processing according to the flowchart illustrated in FIG. 2A.

In step S201, the acquisition unit 110 acquires a still image (real-time image) corresponding to one frame of a video continuously captured by the imaging unit 105. Then, the acquisition unit 110 stores the acquired real-time image in the RAM 103 so that the stored image data can be processed by the detection unit 111 and the recognition unit 112. The acquisition unit 110 repeats the above-mentioned processing in step S201 each time when image information of one complete frame is input from the imaging unit 105 (namely, for each frame), or for a predetermined number of frames, or at predetermined time intervals, and updates the real-time image stored in the RAM 103.

In step S202, the CPU 101 of the information processing apparatus 100 generates a display image that includes a live view image and at least one thumbnail image of image data stored in the storage unit 113 to be displayed on the display screen 120 and outputs the generated display image to the touch panel display device 107. In the present exemplary embodiment, the display screen 120 includes a display area dedicated to the live view image and another display area dedicated to a list including at least one thumbnail image, which can be simultaneously displayed (see FIG. 5). Further, the display control unit 115 stores positional information about each constituent element of the display image in the RAM 103.

However, the configuration of the display screen 120 is not limited to the above-mentioned example. For example, it is useful to display a thumbnail image in response to a tap operation performed on a specific icon in a state where a live view image is displayed on the display screen 120. In the present exemplary embodiment, a predetermined number (e.g., 4) of thumbnail images of image data stored in the storage unit 113 are displayed on the display screen 120.

If the information processing apparatus 100 recognizes a flick operation performed in the right-and-left direction on the above-mentioned area, the information processing apparatus 100 changes four thumbnail images to be sequentially displayed on the area according to the flick operation. Thus, it is feasible to display an appropriate number of thumbnail images while adequately maintaining the size thereof in such a way as to assure the visibility. A user can select desired image data while viewing the displayed thumbnail images. In the present exemplary embodiment, the information processing apparatus 100 generates a live view image to be output to a live view image display area of the display screen 120 with reference to image information input from the imaging unit 105 and directly stored as display image data in the VRAM 106. However, it is useful to display a still image (real-time image) acquired by the acquisition unit 110 for every predetermined number of frames and stored in the RAM 103 on the display screen 120.

In step S203, the CPU 101 performs processing for acquiring information about each transmission destination candidate by performing object detection and recognition processing based on the real-time image stored in the RAM 103. In the processing to be performed in step S203, the CPU 101 detects each area of the real-time image in which another information processing apparatus serving as a transmission destination candidate is present and stores positional information about the detected area and transmission destination information about each information processing apparatus in association with each other.

FIG. 2B is an example flowchart illustrating details of the transmission destination candidate information acquisition processing to be performed in step S203 according to the present exemplary embodiment.

In step S211, the detection unit 111 performs processing for detecting a target object from the real-time image acquired by the acquisition unit 110 and stored in the RAM 103. The target object to be detected from the real-time image in the present exemplary embodiment is a human face or a two-dimensional bar code.

In the present exemplary embodiment, the information processing apparatus 100 detects a detection target object area from the entire real-time image. Therefore, the information processing apparatus 100 analyzes a partial area extracted from the real-time image to determine whether the extracted partial area includes the detection target object. The information processing apparatus 100 obtains a most appropriate partial area by scanning a partial area candidate to be extracted with reference to the position and size thereof, and identifies the detected area as an area in which the detection target object is present (i.e., the detection target object area). Then, the information processing apparatus 100 stores information about the identified area in the RAM 103.

FIG. 3 is an example flowchart illustrating details of the object detection processing to be performed in step S211 according to the present exemplary embodiment.

In step S301, the detection unit 111 determines an initial size of a detection frame to be used in the object detection processing. The detection frame is a frame that defines a partial area to be extracted from a real-time image. The detection frame employed in the present exemplary embodiment is a square. An initial size of the detection frame is generally a minimum value or a maximum value of the detection frame.

In step S302, the detection unit 111 determines an area to be subjected to the object detection processing in the entire real-time image stored in the RAM 103. Usually, the detection unit 111 sets the entire area of the real-time image as the detection target area. However, it is useful to flexibly change the detection target area if there is any constraint in the environment in which the real-time image is captured.

In step S303, the detection unit 111 locates a detection frame having the size determined in step S302 at an initial position in the area to be subjected to the object detection processing.

In step S304, the detection unit 111 analyzes pixel information in the detection frame that has been acquired based on real-time image information and detection frame information and determines whether the disposed detection frame meets the area in which the detection target object is present. In the above-mentioned determination processing, it is useful to check the appropriateness in a relationship between detection frame size and detection object size. In the present exemplary embodiment, the detection unit 111 determines whether the disposed detection frame meets an area in which a two-dimensional bar code or a human face is present. The processing to be performed in step S304 is not so essential in the present exemplary embodiment and can be realized using a conventional image determination technique, and therefore redundant description thereof will be avoided.

In step S305, the detection unit 111 determines whether the area including the detection target object has been detected from the real-time image. If it is determined that the disposed detection frame meets the area in which the detection target object is present in step S304, the detection unit 111 determines that the area including the detection target object has been detected. If it is determined that the area including the detection target object has been detected (YES in step S305), the operation proceeds to step S306. If it is determined that there is not any area that includes the detection target object (NO in step S305), the operation proceeds to step S307.

In step S306, the detection unit 111 stores information about the area determined in step S304 that meets the area in which the detection target object is present, as the area including the detection target object, in the RAM 103. In the present exemplary embodiment, the information to be stored in step S306 includes center coordinate values of the detection frame and a representative size (e.g., the length of one side) of the detection frame.

In step S307, the detection unit 111 determines whether the processing using the detection frame having the size set at the present moment has been performed for the entire area having been set in step S302. If it is determined that the processing using the detection frame having the above-mentioned size has been completed for the entire area (YES in step S307), the operation proceeds to step S309. If it is determined that the processing using the detection frame having the above-mentioned size is not yet completed for the entire area (NO in step S307), the operation proceeds to step S308.

In step S308, the detection unit 111 moves the detection frame to a non-processed region in the target area having been set in step S302. Then, the operation returns to step S304. As a generally known method, it is useful to perform the above-mentioned processing while moving the detection frame in the horizontal direction at intervals of a predetermined distance from the initial position. If the detection frame reaches a terminal end in the horizontal direction, then the method restarts the processing in the horizontal direction after shifting the detection frame to the next line in the vertical direction until the detection frame reaches a terminal end in the vertical direction, thereby completing the scanning in the entire area.

For example, if the detection frame is a square having each size of 128 dots and the target area is a rectangular area having a horizontal size of 800 dots and a vertical size of 480 dots, the detection unit 111 performs the processing of steps S304 to S308 while moving the detection frame in the horizontal direction at intervals of one dot. If the above-mentioned horizontal movement of the detection frame has been repeated 672 times, then the detection unit 111 shifts the detection frame in the vertical direction by one dot and restarts the processing of steps S304 to S308 for the next line.

On the other hand, in step S309, the detection unit 111 determines whether the detection frame size is unchangeable any more. More specifically, the detection unit 111 determines whether the processing for detecting the area in which the detection target object is present while moving the detection frame has been performed for all patterns of settable detection frame sizes. If it is determined that the detection frame size is further changeable (NO in step S309), the operation proceeds to step S310. If it is determined that the detection frame size is unchangeable (YES in step S309), it means that the object detection processing has been completed for all detection frames that are settable with respect to the size and the position. Therefore, the CPU 101 terminates the processing of the flowchart illustrated in FIG. 3. The operation returns to the flowchart illustrated in FIG. 2B.

In step S310, the detection unit 111 changes the detection frame size. Then, the operation returns to the processing in step S303. In a case where the initial size of the detection frame determined in step S301 is the minimum value, the detection unit 111 increases the detection frame size stepwise. On the other hand, in a case where the initial size of the detection frame determined in step S301 is the maximum value, the detection unit 111 decreases the detection frame size stepwise.

For example, it is now presumed that the detection frame size (i.e., the length of one side) can be selected from four types of 128 dots, 256 dots, 384 dots, and 512 dots. If the minimum size (i.e., 128 dots) is selected as the initial value in step S301, the detection unit 111 changes the detection frame size to the next size (i.e., 256 dots) after completing the processing using the detection frame size of 128 dots. Further, the detection unit 111 changes the detection frame size discretely in order of 256 dots, 384 dots, and 512 dots in response to the completion of processing using each detection frame size.

It is useful to perform the above-mentioned object detection processing for each of detection target types being set beforehand. Alternatively, in step S304, it is useful to determine whether any one of detection targets being set beforehand is present in a detection frame having been set beforehand.

If the operation returns to the processing illustrated in FIG. 2B, then in step S212, the detection unit 111 determines whether at least one object has been detected in the object detection processing performed in step S211. If it is determined that at least one object has been detected (YES in step S212), the operation proceeds to step S213. If it is determined that no object has been detected (NO in step S212), the CPU 101 terminates the processing of the flowchart illustrated in FIG. 2B. The operation returns to the main processing illustrated in FIG. 2A.

In step S213, the display control unit 115 generates a display image including the area detected in step S211 in such a way as to be superimposed on the live view image display area and outputs the generated display image to the touch panel display device 107. For example, it is useful that the display image to be generated in step S213 includes a dotted line that surrounds the detected area. In a case where the acquisition unit 110 acquires a real-time image as a processing target from a predetermined number of frames based on the image information of respective frames being continuously input from the imaging unit 105, images of the remaining frames having been not subjected to the detection processing are displayed as live view images.

In this case, the display control unit 115 maintains the area detected from the frame having been subjected to the previous detection processing. Accordingly, in step S213, the display control unit 115 maintains the previously acquired area information until the acquisition unit 110 newly acquires a real-time image. However, the display control unit 115 can update the detection area by separately performing image processing in such a way as to follow up a detected object so that the area can be explicitly moved in step S213.

In step S214, the recognition unit 112 analyzes image information about the area detected in step S211 and performs object recognition processing to identify each object. For example, the recognition unit 112 identifies a person who is included in the processing target real-time image based on a comparison between image features of an area including a human face and face information having been stored beforehand.

Then, the recognition unit 112 acquires identification information (e.g., a name registered in the information processing apparatus 100) and address information about the identified person. Further, the recognition unit 112 stores the acquired information together with corresponding area information in the RAM 103 while associating them with each other.

Alternatively, the recognition unit 112 can analyze two-dimensional bar code information and acquire identification information and address information about another information processing apparatus included in the bar code information. Then, the recognition unit 112 can store the acquired information together with corresponding area information in the RAM 103 while associating them with each other. Another information (e.g., control information about the processing to be performed by the information processing apparatus), if it is included in the bar code information, can be also stored in the RAM 103.

In step S215, the recognition unit 112 determines whether at least one object has been recognized in the object recognition processing performed in step S214. If it is determined that at least one object has been recognized (YES in step S215), the operation proceeds to step S216. If it is determined that no object has been recognized (NO in step S215), the CPU 101 terminates the processing of the flowchart illustrated in FIG. 2B. The operation returns to the main processing illustrated in FIG. 2A.

For example, when a detected human face is not yet registered in the information processing apparatus 100 or when a detected two-dimensional bar code does not include any identification information (or address information) of an information processing apparatus, it means that no object has been recognized by the recognition unit 112 even when at least one object has been detected by the detection unit 111. Accordingly, it is useful to add error display processing when the CPU 101 terminates the processing of the flowchart illustrated in FIG. 2B to enable a user to understand a current situation.

In step S216, the display control unit 115 generates a display image including an object name recognized in step S215 in such a way as to be superimposed on the live view image and outputs the generated display image. In the present exemplary embodiment, the display control unit 115 performs a display control to display the name adjacently to the recognized object based on association information stored in the RAM 103. However, it is useful to superimpose an object name directly on a corresponding object as far as the displayed name can be discriminated. Further, it is useful to provide a display area dedicated to the object name.

Further, the name to be displayed in this case can be the identification information acquired in step S214 or can be more simplified information. For example, it is useful to display a nickname if the object is a human. It is also useful to display a uniform name "printer" regardless of printing type thereof if the object is a printing apparatus. Similar to step S213, in a case where images of frames having been not subjected to the recognition processing are displayed as live view images, the display control unit 115 maintains the recognition result obtained from the frame having been subjected to the previous recognition processing.

Accordingly, in step S216, the display control unit 115 maintains the previously presented name and the display position thereof until the acquisition unit 110 newly acquires a real-time image. However, if image processing is separately performed in such a way as to follow up a detected object, the display control unit 115 can move the display position to follow up the detected object.

In step S217, the CPU 101 stores the recognized object name together with the area information stored in step S306 in the RAM 103 while associating them with each other and then terminates the processing of the flowchart illustrated in FIG. 2B. The operation returns to the main processing illustrated in FIG. 2A.

As mentioned above, the transmission destination candidate acquisition processing according to the present exemplary embodiment includes superimposing a detected object area on a live view image and explicitly indicating a composite image on the display screen (see step S213). However, the above-mentioned processing can be omitted if only one area is detected or the object can be easily discriminated from the background. Explicitly indicating the detected object area enables a user to easily find the position of another information processing apparatus that serves as a transmission destination candidate.

Further, in a case where the object detected area is not explicitly presented, the user can know that a real-time image obtainable in the present shooting environment is inappropriate. In such a case, the user can perform adjustment by changing the position and the angle of the information processing apparatus 100 so that an appropriate real-time image can be acquired in a better environment.

Similarly, the transmission destination candidate acquisition processing according to the present exemplary embodiment includes superimposing the name of a recognized object on the live view image (see step S216). The visibility of the entire live view image may be improved if the above-mentioned processing is omitted. However, displaying the recognized object name brings an effect of enabling a user to quickly find the object recognized by the information processing apparatus 100.

Referring back to the processing of the flowchart illustrated in FIG. 2A, in step S204, the CPU 101 performs touch operation recognition processing. In the processing to be performed in step S204, the CPU 101 follows up a movement of a touched thumbnail image of image data that serves as a transmission target candidate and recognizes a transmission destination apparatus to which the image data is transmitted.

In the present exemplary embodiment, the CPU 101 recognizes a drag and drop operation performed by a user who touches the display screen on which the thumbnail image corresponding to the image data and the live view image are simultaneously displayed and moves the thumbnail image to the position of another information processing apparatus included in the live view image currently displayed on the display screen. While the user performs an image moving operation using the drag and drop operation, the CPU 101 identifies the image data corresponding to the dragged thumbnail image as a transmission target and identifies the information processing apparatus associated with the drop position as a transmission destination.

FIGS. 4A and 4B are flowcharts illustrating an example of the touch operation recognition processing to be performed in step S204 according to the present exemplary embodiment. In the following description, it is presumed that a user performs a single touch operation in which the user touches only one point on the touch panel.

First, in step S401 of the flowchart illustrated in FIG. 4A, the receiving unit 114 determines whether a touch point has been detected by the touch panel display device 107. In performing the determination processing, the receiving unit 114 checks if any information about a touch point has been notified from the touch panel display device 107 during a predetermined period of time after completing the processing in step S401. If it is determined that a touch point has been detected (YES in step S401), the operation proceeds to step S402. If it is determined that no touch point has been detected (NO in step S401), the CPU 101 terminates the processing of the flowchart illustrated in FIG. 4A.

In step S402, the receiving unit 114 stores information about the touch point detected in step S401 in the RAM 103. In the present exemplary embodiment, touch event information to be stored in the RAM 103 includes coordinate information indicating the position of the detected touch point (on a coordinate plane defining a touch detection target area) and information indicating the time when the touch point has been detected.

In step S403, the receiving unit 114 determines whether the touch event received in step S401 is "DOWN." If it is determined that the received touch event is "DOWN" (YES in step S403), the operation proceeds to step S404. If it is determined that the received touch event is not "DOWN" (NO in step S403), the operation proceeds to step S406.

In step S404, the receiving unit 114 determines whether a thumbnail image is displayed on the display screen at the touch point position detected in step S401, considering a relationship between the detected touch point position and the display position of the thumbnail image displayed in step S202. If it is determined that a thumbnail image is displayed at the touch point position (YES in step S404), the operation proceeds to step S405. If it is determined that no thumbnail image is displayed at the touch point position (NO in step S404), the CPU 101 terminates the processing of the flowchart illustrated in FIG. 4A. The operation returns to the main processing illustrated in FIG. 2A.

In step S405, the transmission control unit 116 identifies image data serving as a transmission target candidate. Then, the transmission control unit 116 stores information about the identified transmission target candidate in the RAM 103. Then, the CPU 101 terminates the processing of the flowchart illustrated in FIG. 4A. The operation returns to the main processing illustrated in FIG. 2A.

On the other hand, in step S406, the receiving unit 114 determines whether the touch event received in step S401 is "MOVE." If it is determined that the received touch event is "MOVE" (YES in step S406), the operation proceeds to step S407. If it is determined that the received touch event is not "MOVE" (NO in step S406), the operation proceeds to step S411. For example, when the touch event is "UP" (i.e., neither "DOWN" nor "MOVE"), the operation proceeds to step S411.

In step S407, the receiving unit 114 determines whether the transmission target candidate has been identified. More specifically, the receiving unit 114 determines whether the information about the transmission target candidate identified in step S405 is stored in the RAM 103. If it is determined that the transmission target candidate has been identified (YES in step S407), the operation proceeds to step S408. If it is determined that no transmission target candidate has been identified (NO in step S407), the CPU 101 terminates the processing of the flowchart illustrated in FIG. 4A. The operation returns to the main processing illustrated in FIG. 2A.

In step S408, the display control unit 115 updates the display image to be output to the touch panel display device 107 in such a way as to cause the displayed transmission target candidate (i.e., the thumbnail image) to follow up the moving touch point. In this case, the display control unit 115 calculates a moving direction and a moving distance of the touch point based on the stored touch point information, more specifically based on coordinate values indicating the previously recorded touch point position and coordinate values indicating the present touch point position. Then, the display control unit 115 causes the transmission target candidate (i.e., the thumbnail image) to move in the same manner. If the display control unit 115 completes outputting the updated display image, the operation returns to the main processing illustrated in FIG. 2A. As mentioned above, the thumbnail image moving according to a drag operation can be explicitly presented to the user through the above-mentioned processing.

Next, example processing to be performed when a touch event "UP" is detected is described in detail below with reference to FIG. 4B.

In step S411, the receiving unit 114 determines whether the transmission target candidate is already identified. More specifically, it is checked if information about the transmission target candidate identified in step S405 is stored in the RAM 103. In other words, in step S411, the receiving unit 114 determines whether there is any thumbnail image being currently moved by a drag operation. If it is determined that the transmission target candidate is already identified (YES in step S411), the operation proceeds to step S412. If it is determined that there is not any transmission target candidate having been identified (NO in step S411), the CPU 101 terminates the processing of the flowchart illustrated in FIG. 4B. The operation returns to the main processing illustrated in FIG. 2A.

In step S412, the CPU 101 determines whether a transmission destination candidate object is present at the touch point position detected in step S401 (i.e., the touch point position where the touch event "UP" has been notified) on the display screen. More specifically, the CPU 101 determines whether the touch point position is included in any one of detected areas, based on the object area information stored in step S306. If the touch point position is included, the CPU 101 determines that the transmission destination candidate object is present at the touch point position. If it is determined that the transmission destination candidate object is present at the touch point position (YES in step S412), the operation proceeds to step S413. If it is determined that there is not any transmission destination candidate object positioned at the touch point position (NO in step S412), the operation proceeds to step S415.

In step S413, the transmission control unit 116 identifies a transmission destination information processing apparatus in association with transmission target data. More specifically, the transmission control unit 116 identifies the image data identified as the transmission target candidate in step S405 as the determined transmission target data and identifies the address information associated with the touch point area determined in step S412 as the transmission destination. Then, the transmission control unit 116 associates the transmission destination address information with the information about the transmission target image data.

However, in a case where the transmission control unit 116 transmits image data stored in an external storage device (e.g., a cloud server), it is useful to transmit identification information (e.g., address information) of the image data registered in the cloud server, instead of directly transmitting the image data itself. In this case, in step S413, the transmission control unit 116 associates the transmission destination address information with the identification information of the image data registered in the cloud server.

Thus, another information processing apparatus, when it receives the identification information of the transmission destination, identifies transmission target data in the cloud server based on the received identification information and acquires the identified transmission target data.

Alternatively, it is useful to transmit information including the identification information (e.g., the address information) of the information processing apparatus identified as the transmission destination to the cloud server and cause the cloud server to transmit the transmission target data to the transmission destination. In this case, in step S413, the transmission control unit 116 associates address information of the transmission destination, address information of the cloud server, identification information indicating the transmission target image data, and information about instruction sent to the cloud server with each other.

Further, in step S413, the transmission control unit 116 associates information to be transmitted to the transmission destination other than the transmission target data with the address information of the transmission destination information processing apparatus. For example, in a case where the transmission destination information processing apparatus is a printing apparatus, the printing apparatus transmits an output signal that instructs printing the transmission target data together with information about the transmission target data to enable the user to control output processing to be performed at the transmission destination through a sequence of intuitive operations.

To realize the above-mentioned intuitive operation, if the information recognized by the recognition unit 112 includes control information about processing to be performed by the transmission destination information processing apparatus, the transmission control unit 116 associates the control information with the address information of the transmission destination.

In step S414, the transmission unit 117 performs processing for transmitting the transmission target data to the transmission destination information processing apparatus based on the information associated with the transmission destination information processing apparatus identified by the transmission control unit 116. In this case, it is useful to additionally perform processing for appropriately compressing the transmission target data according to a conventional technique. Further, as mentioned above, the transmission unit 117 can select a transmission method considering the type of the recognized address information (e.g., email address or IP address). In a case where the cloud server mediates the transmission of transmission target data to the transmission destination information processing apparatus, the transmission unit 117 transmits information associated with the address information of the transmission destination to the cloud server.

In step S415, the receiving unit 114 notifies each functional unit of no input of the drag and drop operation. The information stored in the RAM 103 is initialized and the operation of the information processing apparatus 100 returns to its initial state. More specifically, the identification state of the transmission target object identified by the transmission control unit 116 is released at the termination timing of the drag and drop operation, if no transmission destination candidate object is identified. Then, the CPU 101 terminates the processing of the flowchart illustrated in FIG. 4B.

When the operation returns to the main processing illustrated in FIG. 2A, then in step S205, the CPU 101 determines whether the receiving unit 114 has been instructed to terminate the function of transmitting data to another information processing apparatus. In the present exemplary embodiment, if the receiving unit 114 receives a tap operation performed on a specific icon located at a predetermined display position of the display screen, the CPU 101 recognizes it as the instruction to terminate the function of transmitting data to another information processing apparatus. Further, for example, if a physical button is pressed to designate an image reproduction mode or when another application is launched, the CPU 101 can recognize it as the termination instruction.

According to the processing described with reference to FIGS. 4A and 4B, the operation performed by the user is the single touch operation. However, the operation performed by the user can be a multi-touch operation by which the user touches a plurality of points simultaneously to drag and drop a plurality of thumbnail images simultaneously. In this case, the CPU 101 identifies each touch point and performs the above-mentioned processing for the identified touch point.

FIG. 5 schematically illustrates the status of each photographic subject that is present in front of a user holding the information processing apparatus 100 that can be operated by the user to capture an image including the photographic subjects. A person 501, a printer 503, and a table 505 are practical photographic subjects. The information processing apparatus 100 acquires a real-time image of each photographic subject via the imaging unit 105 (see step S201). Then, a live view image is displayed together with a data tray 506 on the display screen 120. The data tray 506 is an area in which a list of thumbnail images is presented in such a way as to be superimposed on the live view image (see step S202). According to the example illustrated in FIG. 5, the information displayed in the display area of the data tray 506 includes thumbnail images 507 to 510 that correspond to photographic data stored in the storage unit 113.

Next, example object detection processing that can be performed by the information processing apparatus 100 illustrated in FIG. 5 is described in detail below with reference to FIGS. 6A to 6D. The processing for selecting the detection frame size and position according to the flowchart illustrated in FIG. 3 is usually performed without displaying anything on the display screen. However, the above-mentioned processing is described in detail below based on an explicit display on the display screen 120.

The information processing apparatus 100 determines an initial size of a detection frame 602 to be used in the two-dimensional bar code detection processing (see step S301). In the present exemplary embodiment, the initial size of the detection frame 602 is the settable minimum value. Then, the information processing apparatus 100 determines an object detection target area 601 (see step S302). In the present exemplary embodiment, the target area 601 is a partial area of the real-time image indicated by a bold line. In other words, the target area 601 corresponds to an area in which the live view image is displayed on the display screen 120 without being concealed by the data tray 506.

FIG. 6A illustrates a state where the detection frame 602 having the above-mentioned initial size is located at its initial position (see step S303). Then, the information processing apparatus 100 determines whether an imaged detection target object is present in the detection frame 602 (see step S304). According to the state illustrated in FIG. 6A, no two-dimensional bar code and no human face are present in the area of the detection frame 602. Therefore, the information processing apparatus 100 determines that the area surrounded by the detection frame 602 is not an area that includes a captured object (NO in step S305).

In the state illustrated in FIG. 6A, the detection frame 602 has not yet moved around in the entire region of the target area 601 (NO in step S307). Therefore, the information processing apparatus 100 moves the detection frame 602 (see step S308). FIG. 6B illustrates another state of the detection frame 602 having been moved to the right from the initial position.

After completing the detection processing for the entire detection area with the detection frame 602 having the initial size, the information processing apparatus 100 determines whether the size of the detection frame 602 is still changeable (see step S309). If the detection frame size is changeable, then in step 310, the information processing apparatus 100 performs detection frame size change processing. FIG. 6C illustrates an example of the detection frame 602 whose size is enlarged by a predetermined amount (see step S310).

FIG. 6D illustrates a state where the area surrounded by the detection frame 602 meets a detection target object (i.e., a two-dimensional bar code) as a result of repetitively performed object detection and moving processing with the enlarged detection frame 602. As the two-dimensional bar code is detected in the detection frame 602 (YES in step S305), the information processing apparatus 100 stores information about the detection frame area determined as including the two-dimensional bar code 504 (see step S306). Subsequently, the information processing apparatus 100 can detect a face 502 of the person 501 by repeating the detection processing while selecting the position and the size of the detection frame 602.

FIG. 7A illustrates a state where the detection area of the two-dimensional bar code 504 and the detection area of the human face 502, which have been detected as mentioned above, are explicitly presented by the information processing apparatus 100 (see step S213). In the present exemplary embodiment, a dotted line frame 701 indicates the area of the detected face 502 and a dotted line frame 702 indicates the area of the detected two-dimensional bar code 504.

Next, each object can be discriminated by performing recognition processing on the detected area (see step S214). FIG. 7B illustrates a state where a recognized object name is displayed for a corresponding detected area (see step S216). As a result of the object recognition processing, the information processing apparatus 100 recognizes the face 502 as the face of the person 501 stored beforehand. A registered name 703, i.e., "A-san", is displayed at an upper part of the region including the face 502. Similarly, the information processing apparatus 100 recognizes the two-dimensional bar code 504 as the printer 503. A name 704, i.e., "Printer X", is displayed at an upper part of the region including the two-dimensional bar code 504, based on information included in the two-dimensional bar code.

FIG. 7C illustrates photographic data 509 displayed on the display screen 120 together with a finger 705 of a user. When the display screen 120 is touched by the finger 705, a "DOWN" event is detected (YES in step S403). The information processing apparatus 100 determines whether a thumbnail image is displayed at the touched position (see step S404). In the example illustrated in FIG. 7C, the thumbnail 509 is displayed at the touch position of the finger 705 (YES in step S404). Therefore, the information processing apparatus 100 identifies photographic data corresponding to the thumbnail 509 as a transmission target candidate (see step S405).

Next, FIG. 7D illustrates a state where the finger 705 is moving while it continuously contacts the display screen 120, which corresponds to the processing to be performed in step S408 of the flowchart illustrated in FIG. 4A. In FIG. 7D, the position where the finger 705 can be detected is different from the touch start position illustrated in FIG. 7C. Therefore, a "MOVE" event is detected (YES in step S406). As the transmission target candidate is already identified (YES in step S407), the information processing apparatus 100 displays the thumbnail 509 of the photographic data in such a way as to follow up the movement of the finger 705 (see step S408).

FIG. 7E illustrates a state where the finger 705 has further moved and is then released from the display screen 120 when it enters the detection area 701 of the face 502. The illustration of a transparent finger indicates that the finger 705 is spaced from the surface of the display screen 120. Therefore, an "UP" event is detected (NO in step S406). As the transmission target candidate is already identified (YES in step S411), the information processing apparatus 100 determines whether an object designated as a transmission destination candidate is present on the position where the finger 705 has been released (see step S412).

According to the state illustrated in FIG. 7D, the touch position where the "UP" event has been detected (namely, the position where the finger 705 has been released) is included in the detection area 701 of the face 502 (YES in step S412). Accordingly, the transmission destination information processing apparatus is identified as being a destination indicated by address information of the person 501 registered beforehand in the information processing apparatus 100. Then, the information processing apparatus 100 associates the address information with the photographic data of the thumbnail 509 (i.e., the transmission target data) (see step S413). Further, the information processing apparatus 100 transmits the photographic data (see step S414).

More specifically, in a case where the address information of the person 501 is a registered email address, the transmission destination information processing apparatus is an email server. The information processing apparatus 100 transmits an email including the photographic data of the thumbnail 509 attached thereto to the email address. In this case, it is useful to launch an email application in a state where the email address of the person 501 is indicated in an email address field to enable a user to immediately input a body of the email. Further, for example, in a case where IP address of a specific information processing apparatus owned by the person 501 is registered beforehand as the address information of the person 501, it is useful to directly transmit the photographic data to the specific information processing apparatus via an available LAN environment.

As mentioned above, the information processing apparatus 100 according to the present exemplary embodiment designates a detection target included in a live view image displayed on the display screen as a transmission destination candidate. Therefore, a user can recognize each transmission destination candidate object when the imaging unit 105 is directed to a photographic subject without touching the display screen 120.

Further, the information processing apparatus 100 according to the present exemplary embodiment receives an operation for moving an object associated with a transmission target candidate on the same display screen. Further, the information processing apparatus 100 associates the data corresponding to the moved object (i.e., a transmission target) with a detection target object captured as a photographic subject at the position to which the object has been moved (i.e., a transmission destination). Thus, it becomes feasible to set a transmission target and a transmission destination thereof with an intuitive operation, for each object existing in an area captured by the imaging unit 105 of the information processing apparatus 100.

In the present exemplary embodiment, the drop operation has been described as being performed on a live view video that is constantly updated. However, a user can perform a drop operation on a paused screen that displays an image captured in real time and temporarily stored. Further, the operation using a pointing device is not limited to an object touch operation to be performed on a touch panel. For example, a user can operate another pointing device (e.g., a mouse).

A modified example 1 of the first exemplary embodiment includes performing object detection processing and object recognition processing in response to a user operation for dragging and dropping an object, to reduce a processing load of the information processing apparatus 100, as described in detail below. In each of the following flowcharts describing example processing to be performed in the modified example, if a processing step is denoted by a step number identical to that of the flowchart described in the first exemplary embodiment, processing to be performed in the processing step is identical to the processing performed in the same step described in the first exemplary embodiment. Therefore, redundant description thereof will be avoided.

An information processing apparatus 100 according to the modified example 1 has a hardware configuration and a functional configuration that are similar to those of the information processing apparatus 100 described in the first exemplary embodiment with reference to FIGS. 1A and 1B. Therefore, redundant description thereof will be avoided.

FIGS. 8A and 8B are flowcharts illustrating example processing that can be performed by the information processing apparatus 100 in the modified example 1 to transmit image data to another information processing apparatus. In the modified example 1, if the information processing apparatus 100 launches a function of transmitting data stored in the storage unit 113 in response to a mode selection or an application startup, the CPU 101 starts the following processing according to the flowcharts illustrated in FIGS. 8A and 8B.

The flowchart illustrated in FIG. 8A is different from the flowchart illustrated in FIG. 2A described in the first exemplary embodiment in that the transmission destination candidate acquisition processing (see step S203) is omitted. More specifically, in step S204A, the CPU 101 starts touch operation recognition processing immediately after completing the processing for displaying a live view image and a thumbnail image list (see step S202). The rest of the flowchart illustrated in FIG. 8A is similar to that described in the first exemplary embodiment. Therefore, redundant description thereof will be avoided.

FIGS. 9A and 9B are example flowcharts illustrating details of the touch operation recognition processing to be performed in step S204A in the modified example 1, which correspond to the flowcharts illustrated in FIGS. 4A and 4B described in the first exemplary embodiment.

Processing to be performed in steps S401 to S411 is similar to the processing described in the first exemplary embodiment. Therefore, redundant description thereof will be avoided. In the modified example 1, if the receiving unit 114 determines that the transmission target candidate is already identified (YES in step S411), the operation proceeds to step S203A to perform transmission destination candidate acquisition processing.

In step S203A, similar to the first exemplary embodiment, the CPU 101 performs processing for acquiring a transmission destination candidate from a real-time image according to the flowchart illustrated in FIG. 3. Then, if the detection unit 111 determines that the detection frame size is unchangeable anymore (YES in step S309), the operation proceeds to step S412 of the flowchart illustrated in FIG. 9B.

Processing to be performed in steps S412 to S415 is similar to the processing described in the first exemplary embodiment.

FIGS. 10A to 10F illustrate an example operation performed by a user who operates the information processing apparatus 100 according to the modified example 1 in an environment similar to that illustrated in FIG. 5. It is now presumed that the contents displayed on the display screen 120 are similar to those described in the first exemplary embodiment (see FIG. 5). Hereinafter, an example operation that can be performed by the information processing apparatus 100 according to the modified example 1 is described in detail below with reference to FIGS. 10A to 10F.

FIG. 10A illustrates a state where a user has moved the finger 705 to drag the thumbnail image 509 and drop it on the face 502 of the person 501 and then the user has released the finger 705. In FIG. 10A, the illustration of a transparent finger indicates that the finger 705 is spaced from the surface of the display screen 120. However, in the modified example 1, FIG. 10A is different from FIG. 7C in that no frame line is displayed because both the face 502 and the two-dimensional bar code 504 have not been detected or recognized at this moment.

In the operation example illustrated in FIG. 10A, an "UP" event is detected (NO in step S406) and the photographic data corresponding to the thumbnail 509 is already identified as the transmission target candidate (YES in step S411). Therefore, the operation proceeds to step S203A to perform the transmission destination candidate acquisition processing.

FIG. 10B illustrates a state where each area of the face 502 of the person 501 and the two-dimensional bar code 504 of the printer 503 is explicitly presented because they have been detected through the transmission destination candidate acquisition processing performed in step S203A (see step S213). In the modified example 1, a dotted line is used to explicitly surround each of the detected areas.

Further, FIG. 10C illustrates a state where a name of the person 501 is displayed as a recognition result of the face 502 and a name of the printer 503 is displayed as a recognition result of the two-dimensional bar code 504 (see step S216). Thus, the information processing apparatus 100 determines that at least one object has been recognized (YES in step S212) and displays the name 703 (i.e., "A-san") of the recognized person 501 at an upper part of the region including the face 502. Similarly, the information processing apparatus 100 displays the name 704 (i.e., "Printer X") of the recognized printer 503 at an upper part of the region including the two-dimensional bar code 504.

The face 502 (i.e., the transmission destination candidate) is present at the touch point where the "UP" event has been detected (YES in step S412). Therefore, the information processing apparatus 100 identifies the transmission destination information processing apparatus as being a destination indicated by address information of the person 501 registered beforehand in the information processing apparatus 100. Then, the information processing apparatus 100 associates the address information with the photographic data of the thumbnail 509 (i.e., the transmission target data) (see step S413). Then, the information processing apparatus 100 transmits the photographic data (see step S414).

As mentioned above, in the modified example 1, the information processing apparatus 100 does not perform the object detection processing and the object recognition processing until a user drops an object. Thus, it is feasible to reduce the processing load of the information processing apparatus 100 compared to a case where the information processing apparatus 100 constantly performs the object detection processing and the object recognition processing for occasionally acquired real-time images. Further, in the modified example 1, the start timing of the object detection processing is not limited to an object drop operation.

For example, the information processing apparatus 100 can start the object detection processing when a user touches an object. In this case, the information processing apparatus 100 starts the processing of step S203A after completing the processing of step S405. The information processing apparatus 100 performs the object detection processing and the object recognition processing while following up the touch operation. Performing the above-mentioned processing is effective in that the information processing apparatus 100 can start the processing before the user completes the operation. In other words, it is feasible to reduce the time required for the user to wait until the transmission destination candidate acquisition processing terminates after the drop operation has been completed.

A modified example 2 is characterized in that a detection target area to be used in the object detection processing is narrower than that described in the modified example 1. More specifically, the detection target area according to the modified example 2 is a limited region including a coordinate point where the data is dropped. Therefore, reducing the required amount of image processing is feasible and further reducing the amount of processing load is feasible, as described in detail below.

According to the modified example 2, in step S203A, the CPU 101 performs transmission destination candidate acquisition processing according to a flowchart illustrated in FIG. 8B. The flowchart illustrated in FIG. 8B is different from the flowchart illustrated in FIG. 2B in that the CPU 101 performs the object detection processing in step S211A according to a flowchart illustrated in FIG. 11.

FIG. 11 is a flowchart illustrating an example of the object detection processing to be performed in step S211A according to the modified example 2. The flowchart illustrated in FIG. 11 is different from the flowchart illustrated in FIG. 3 in that the CPU 101 determines an area to be subjected to the object detection processing after the initial size of the detection frame has been set in step S301.

In the modified example 2, in step S302B, the CPU 101 determines the area to be subjected to the object detection processing based on the coordinate position where the touch point has been released and the detection frame size. A standard object detection target area to be set in the modified example 2 has a center positioned at the coordinate position where a user has dropped data (i.e., the touch released coordinate point) and has a square area comparable to four times the size of the detection frame being already set at this moment.

The CPU 101 performs processing in steps S303 to S309 for the determined detection target area in the same manner as the modified example 1. However, in the modified example 2, if it is determined that the detection frame size is further changeable (NO in step S309), then in step S310, the CPU 101 changes the detection frame size. The operation returns to step S302B to determine the detection target area again. The rest of the flowchart is similar to that described in the modified example 1. Therefore, redundant description thereof will be avoided.

Hereinafter, it is presumed that a user operates the information processing apparatus 100 according to the modified example 2 in an environment similar to that illustrated in FIG. 5. Further, it is presumed that the contents displayed on the display screen 120 are similar to those described in the first exemplary embodiment (see FIG. 5). Hereinafter, an example of the operation that can be performed by the information processing apparatus 100 according to the modified example 1 is described in detail below with reference to FIGS. 10A to 10F.

FIG. 10A illustrates a state where a user has moved the finger 705 to drag the thumbnail image 509 and drop it on the face 502 of the person 501 and the user has released the finger. In FIG. 10A, the illustration of a transparent finger indicates that the finger 705 is spaced from the surface of the display screen 120. However, in the modified example 2, FIG. 10A is different from FIG. 7C in that no frame line is displayed because both the face 502 and the two-dimensional bar code 504 have not been detected or recognized at this moment.

In the operation example illustrated in FIG. 10A, an "UP" event is detected (NO in step S406) and the photographic data corresponding to the thumbnail 509 is already identified as the transmission target candidate (YES in step S411). Therefore, the operation proceeds to step S203A to perform the transmission destination candidate acquisition processing.

Next, an example of the object detection processing performed according to the flowchart illustrated in FIG. 11 is described in detail below with reference to FIGS. 10D to 10F. The processing for determining the detection target area and selecting the detection frame size and position according to the flowchart illustrated in FIG. 11 is usually performed without displaying anything on the display screen. However, the above-mentioned processing is described in detail below based on an explicit display on the display screen 120.

FIG. 10D illustrates a state where a square area having been set at the detection target area. The square area has a center at a coordinate position 1001 where the user has released the touch operation and has a size comparable to four times the initial size (see step S302B). In the modified example 2, the initial size of the detection frame is equal to a settable minimum value (i.e., a minimum size capable of identifying the presence of a detection target in the detection frame through image processing). An area having the center at the touch point 1001 and having vertical and horizontal sides each having the length comparable to two times the size of the detection frame 602 is determined as a target area 1002.

In general, there is a higher possibility that the object that the user wants to set as a transmission destination is present at the position where the user has dropped the thumbnail image 509. Therefore, it is feasible to detect the transmission destination candidate in a concentrated manner in a narrow target area around the drop position. The above-mentioned enlargement size (i.e., "two times") is a mere example. An area enlarged by another magnification can be set as a target area.

FIG. 10E illustrates the size of the detection frame 602 changed after the scanning using the detection frame having the initial size has been thoroughly performed in the entire target area (see step S310) and the detection target area has been newly determined (see step S302B). FIG. 10F illustrates a repetitive change of the detection frame size after the scanning has been completed in the entire region of the newly determined target area (see step S310) and the target area has been further updated.

Further, FIG. 10F illustrates a state where the face area 602 of the person 501 has been detected (YES in step S305) after the detection frame size has been changed (see step S310). In FIG. 10F, the vertical size of the target area is "two times" the detection frame having been set. The upper limit of the target area meets the vertical limit of a real-time image. Further, as the drop position is the center, the right area reaches the right edge of the real-time image. Therefore, the target area is not a square. As mentioned above, the target area is basically a square area comparable to four times the detection frame size and is adequately modified with reference to the real-time image size and the drop position.

As mentioned above, the information processing apparatus 100 according to the modified example 2 performs the object detection processing and the object recognition processing in response to a user's object drop operation. In this case, the information processing apparatus 100 initially sets a narrow area including drop position on a real-time image as a target area to be subjected to the object detection processing. If an object designated as a transmission destination candidate has not been detected in the limited target area, the information processing apparatus 100 gradually expands the target area.

There is a higher possibility that an information processing apparatus that the user wants to set as a transmission destination is present at the position where the user has dropped the object. Therefore, the information processing apparatus 100 according to the modified example 2 prioritizes the object detection processing to be performed in a limited region including the drop position so that the transmission destination candidate can be promptly presented to the user. Thus, it is feasible to reduce the load of the detection processing while efficiently presenting the appropriate transmission destination candidate.

A modified example 3 is characterized in that the object detection processing is performed each time a real-time image is acquired and the object recognition processing is performed when a user starts an object drag operation, as described in detail below.

Thus, the user is only required to direct a camera toward an object to check if the object can be designated as a transmission destination. The information processing apparatus can reduce the processing load required for the object recognition processing.

An information processing apparatus 100 according to the modified example 3 has a hardware configuration and a functional configuration that are similar to those of the information processing apparatus 100 described in the first exemplary embodiment with reference to FIGS. 1A and 1B. Therefore, redundant description thereof will be avoided.

In the modified example 3, the information processing apparatus 100 invokes transmission destination candidate acquisition processing in step S203C according to a flowchart illustrated in FIG. 12A and performs processing similar to that described in the first exemplary embodiment until the area including the object detected in step S213 can be explicitly presented. In the modified example 3, after the area including the object detected in step S213 has been explicitly presented, the information processing apparatus 100 starts touch operation recognition processing in step S204C.

FIGS. 13A and 13B are flowcharts illustrating an example of the touch operation recognition processing to be performed in step S204C according to the modified example 3. Processing to be performed in steps S401 to S408 are similar to the processing performed in the first exemplary embodiment with reference to the flowchart illustrated in FIG. 4A.

In the modified example 3, after starting the processing for displaying the thumbnail image in such a way as to follow up the touch point in step S408, the information processing apparatus 100 performs object recognition processing in step S1301. FIG. 14A is a flowchart illustrating an example of the object recognition processing to be performed in step S1301. In FIG. 14A, processing to be performed in steps S214 to S217 is similar to the processing performed in the first exemplary embodiment according to the flowchart illustrated in FIG. 2B. Therefore, redundant description thereof will be avoided.

In step S217, if the recognized object name has been stored in the RAM 103 in association with the area information stored in step S306, the CPU 101 terminates the processing of the flowchart illustrated in FIG. 14A. The operation returns to the touch operation recognition processing illustrated in FIGS. 13A and 13B. The rest of the processing is similar to the processing performed in the first exemplary embodiment according to the flowchart illustrated in FIGS. 4A and 4B. Therefore, redundant description thereof will be avoided.

FIGS. 15A to 15D illustrate an example operation performed by a user who operates the information processing apparatus 100 according to the modified example 3 in an environment similar to that illustrated in FIG. 5. It is now presumed that the contents displayed on the display screen 120 are similar to those described in the first exemplary embodiment (see FIG. 5). Hereinafter, an example operation that can be performed by the information processing apparatus 100 according to the modified example 3 is described in detail below with reference to FIGS. 15A to 15D.

FIG. 15A illustrates a state where the detection area of the two-dimensional bar code 504 and the detection area of the human face 502 are explicitly presented by the information processing apparatus 100 (see step S213). In the modified example 3, a dotted line frame is used to explicitly present each detected area as mentioned above in the first exemplary embodiment (see FIG. 7A). In the modified example 3, the object recognition processing is not yet started at this moment. Therefore, the name "A-san" of the person 501 is not yet displayed in the vicinity of the face 502. Similarly, the name "Printer X" of the printer 503 is not yet displayed in the vicinity of the two-dimensional bar code 504.

FIG. 15B illustrates a result of the object recognition processing (see step S1301) displayed when a user has started an operation for dragging the thumbnail image 509 with the finger 705. In the modified example 3, as the user has dragged the photographic data 509 toward the face 502 from the state illustrated in FIG. 15A, both the person 501 and the printer 503 can be recognized (see step S214), and names "A-san" and "Printer X" are displayed (see step S217).

As mentioned above, the information processing apparatus 100 according to the modified example 3 does not perform the object recognition processing until a user starts an object drag operation. Thus, it is feasible to reduce the processing load of the information processing apparatus 100 compared to a case where the information processing apparatus 100 constantly performs the object recognition processing for a real-time video. Further, the user can easily recognize an object detected by the information processing apparatus 100. Further, it is useful that the information processing apparatus 100 performs the object detection processing in response to a "DOWN" event detected at an object display position and performs the object recognition processing in response to an "UP" event detected at the detected area.

A modified example 4 is characterized in that the order of the object recognition processing to be performed in a plurality of areas each indicating a transmission destination candidate is controlled based on the direction of a drag operation performed by a user, in a case where the object recognition processing is performed in response to the drag operation started by the user (see the modified example 3), as described in detail below.

FIG. 16A is a block diagram illustrating a functional configuration of the information processing apparatus 100 according to the modified example 4. The configuration illustrated in FIG. 16A is different from the configuration illustrated in FIG. 1B in that a distance acquisition unit 1601 is newly added. The distance acquisition unit 1601, which can be constituted by the CPU 101, the ROM 102, and the RAM 103, is configured to acquire a distance between the drag operation start position, which can be received by the receiving unit 114, and the area detected by the detection unit 111, on the display screen 120.

The distance acquisition unit 1601 sets the order of the object recognition processing to be performed in each area detected by the detection unit 111, in the order of shortness in the acquired distance. The recognition unit 112 according to the modified example 4 performs the object recognition processing in each area according to the order having been set by the distance acquisition unit 1601.

In the modified example 4, similar to the modified example 3, the information processing apparatus 100 invokes the transmission destination candidate acquisition processing in step S203C according to the flowchart illustrated in FIG. 12A. After the area indicating the object detected in step S213 has been explicitly presented, the information processing apparatus 100 starts the touch operation recognition processing in step S204C. Then, upon starting the processing for displaying the thumbnail image in such a way as to follow up the touch point in step S408, the information processing apparatus 100 performs the object recognition processing in step S1301.

However, in the modified example 4, the information processing apparatus 100 performs the object recognition processing to be performed in step S1301 according to a flowchart illustrated in FIG. 14B. First, in step S1401, the distance acquisition unit 1601 acquires a moving direction of the touch point where the "MOVE" event has been detected. In the modified example 4, to acquire the moving direction, the distance acquisition unit 1601 calculates a formula expressing a straight line passing through the touch point position where the "DOWN" event has been detected and the touch point position where the "MOVE" event has been detected immediately before, in a coordinate plane defined on the display screen 120. Alternatively, the distance acquisition unit 1601 can calculate a straight line passing through touch points where the "MOVE" event has been continuously detected.

Then, the distance acquisition unit 1601 obtains coordinate information about a center point of each area based on the area information stored in the RAM 103 in step S306. Then, the distance acquisition unit 1601 acquires the distance between the drag operation start position and the object detected by the detection unit 111, on the display screen 120, by calculating the length of a perpendicular extending from the center point of each area to the calculated straight line.

However, the distance acquisition method employable in the modified example 4 is not limited to the above-mentioned calculation method. For example, one of other employable methods includes dividing the display screen 120 into a plurality of partial areas and acquiring a predetermined distance with reference to a positional relationship between the drag operation start position and a partial area in which the center point of the detection area is included.

Next, in step S1402, the distance acquisition unit 1601 sets the order of the object recognition processing for each area stored in the RAM 103 in such a way as to prioritize an area that is shorter in the acquired distance. Information indicating the determined order is added to related area information stored in the RAM 103 and notified to the recognition unit 112. Next, in step S1403, the recognition unit 112 selects an area detected by the detection unit 111 according to the order having been set in step S1402.

Processing to be performed in the following steps S214 to S217 is similar to the processing of the flowchart illustrated in FIG. 2B described in the first exemplary embodiment. Therefore, redundant description thereof will be avoided. In the modified example 4, if the information about a recognition result is stored in association with area information in step S217, then in step S1404, the recognition unit 112 determines whether the object recognition processing has been completed for all areas whose information is stored in the RAM 103.

If it is determined that the object recognition processing is not yet completed for all areas, more specifically, if there is any remaining unprocessed area (NO in step S1404), the operation returns to step S1403 in which the next area is selected according to the determined order. If it is determined that the object recognition processing has been completed for all areas (YES in step S1404), the CPU 101 terminates the processing of the flowchart illustrated in FIG. 14B. The operation returns to the touch operation recognition processing illustrated in FIGS. 13A and 13B. The rest of the processing is similar to the processing performed in the first exemplary embodiment according to the flowchart illustrated in FIGS. 4A and 4B. Therefore, redundant description thereof will be avoided.

FIG. 15C illustrates a state where the object recognition processing according to the modified example 4 has been started based on the distance between the drag operation start position and the detected area. The state illustrated in FIG. 15C is different from the state illustrated in FIG. 15A in that the user has moved the touch point from a position 1501 to a position 1502 to perform an operation for dragging the thumbnail image 509.

In FIG. 15C, a dotted line 1505 is a straight line passing through the position 1501 and the position 1502, which can be calculated by the distance acquisition unit 1601. Further, a point 1503 represents a center point of the detection area 701 of the face 502. A point 1504 represents a center point of the area 702 of the detected two-dimensional bar code 504.

In the modified example 4, the distance acquisition unit 1601 acquires the length of a perpendicular 1506 extending from the point 1503 to the line 1505 as a distance between the drag operation start position 1502 and the area 701. Further, similarly, the distance acquisition unit 1601 acquires the length of a perpendicular 1507 extending from the point 1504 to the line 1505 as the distance between the drag operation start position 1502 and the area 702.

Then, the distance acquisition unit 1601 sets the object recognition processing in such a way as to be performed in the order of shortness in the acquired distance. More specifically, the distance acquisition unit 1601 designates the area 701 as a region to be processed first and designates the area 702 as a region to be processed next. Accordingly, in FIG. 15C, the person 501 can be recognized in the area 701 where the object recognition processing is first performed (see step S214) and the name "A-san" of the person 501 can be displayed (see step S216).

As mentioned above, the information processing apparatus 100 according to the modified example 4 does not perform the object recognition processing until a user starts an object drag operation and controls the recognition processing order based on the position to which the user has moved the object. This is because there is a higher possibility that a desired transmission destination candidate is present in an area existing in the object moving direction, since the user usually starts the drag operation after visually confirming the transmission destination candidate area explicitly superimposed on a live view image.

Thus, it is feasible to efficiently acquire information about an object having a higher possibility of coinciding with the user's designated transmission destination in the real-time image while reducing the processing load of the information processing apparatus 100. Further, the information processing apparatus 100 continues the object recognition processing in another area according to the determined order. Therefore, the user can finally confirm all of the transmission destination candidates. For example, in a case where the drag and drop operation is repetitively performed two times or more, the processing efficiency is good because it is unnecessary to set the processing order again.

As a modification of the modified example 4, in a case where a user performs a drop operation (namely, when an "UP" event has been detected) before the information processing apparatus 100 completes the object recognition processing for all areas, the information processing apparatus 100 can interrupt the object recognition processing and return to the touch operation recognition processing illustrated in FIGS. 13A and 13B.

In this case, if the user drops an object in an area to be processed at earlier timing, it is feasible to cancel the recognition processing to be performed for the remaining areas. Accordingly, in a case where the number of detected areas is large, it is feasible to prevent the object recognition processing from being performed unnecessarily. In other words, the processing load of the information processing apparatus 100 can be reduced greatly.

In the modified example 4, the information processing apparatus 100 obtains the touch point moving direction as a straight line and determines the processing order based on the length of a perpendicular extending from the center point of the detected area. However, the processing order determination method is not limited to the above-mentioned example. For example, it is useful to acquire an inclination angle of a straight line extending from the touch point and prioritize the object recognition processing to be performed for an object included in an area defined by + or −X angles.

Further, as another method capable of obtaining similar effects, it is useful to obtain a straight line passing through an object position where a "DOWN" event has been detected and the center point of the detected area and then determine the processing order considering the length of a perpendicular extending from the position where the "MOVE" event has been detected.

A modified example 5 is characterized in that a control is performed considering a moving speed of user's drag operation in addition to the positional information about the drag operation in a case where the order of object recognition processing to be performed in each detected area is determined in the same manner as the modified example 4, as described in detail below.

FIG. 16B is a block diagram illustrating a functional configuration of the information processing apparatus 100 according to the modified example 5. The functional configuration illustrated in FIG. 16B is different from the configuration illustrated in FIG. 1B in that a speed acquisition unit 1602 is newly added. The speed acquisition unit 1602, which can be constituted by the CPU 101, the ROM 102, and the RAM 103, is configured to acquire a touch point moving speed based on touch point position information periodically received by the receiving unit 114 and detection time information.

Further, the speed acquisition unit 1602 acquires the distance between the latest touch point and the area detected by the detection unit 111 on the display screen 120.

Then, the speed acquisition unit 1602 determines the order of object recognition processing to be performed in each area detected by the detection unit 111, with reference to the acquired moving speed and the acquired distance, in such a way as to prioritize an area having a higher probability of user dropping an object. The recognition unit 112 according to the modified example 5 performs the object recognition processing in each area with reference to the order having been determined by the distance acquisition unit 1601.

In the modified example 5, the information processing apparatus 100 performs processing according to the flowcharts illustrated in FIGS. 12A and 12B, FIG. 3, and FIGS. 13A and 13B before starting the object recognition processing in step S1301, as described in the modified example 3 and the modified example 4. Therefore, redundant description thereof will be avoided.

In the modified example 5, the information processing apparatus 100 performs the object recognition processing to be performed in step S1301 according to a flowchart illustrated in FIG. 14C. In step S1411, the speed acquisition unit 1602 acquires the touch point moving speed. In the modified example 5, the speed acquisition unit 1602 can calculate the speed based on the information acquired by the receiving unit 114 and stored in the RAM 103 in step S402, based on a distance between the last touch point (i.e., the latest touch point) position and the last but one touch point position and a detection time difference. The above-mentioned speed calculation method is a mere example. Any other calculation method is employable appropriately.

Next, in step S1412, the speed acquisition unit 1602 acquires the distance between the latest touch point position and the detected area, based on the information stored in the RAM 103.

Then, in step S1413, the speed acquisition unit 1602 determines the order of object recognition processing to be performed in each area stored in the RAM 103, based on the acquired speed and the acquired distance, in such a way as to prioritize an area having a higher probability of user dropping an object. Information indicating the determined order is added to related area information stored in the RAM 103 and notified to the recognition unit 112.

In the modified example 5, if the moving speed is slower than a predetermined speed, the speed acquisition unit 1602 determines that there is a higher probability of user dropping an object in an area shorter in the distance acquired in step S1412. Further, if the moving speed is faster than the predetermined speed, the speed acquisition unit 1602 determines that there is a higher probability of user dropping an object in an area longer in the distance acquired in step S1412. This is because it is generally believed, based on the fact that the moving speed is faster, that the user intends to move the object to a further remote point. The rest of the processing is similar to the processing performed in the modified example 4. Therefore, redundant description thereof will be avoided.

FIG. 15D illustrates a state where the object recognition processing according to the modified example 5 has been started based on the distance between the drag operation start position and the detected area. The state illustrated in FIG. 15D is different from the state illustrated in FIG. 15A in that the user has moved the touch point from a position 1508 to a position 1509 to perform an operation for dragging the thumbnail image 507.

In step S1411, the speed acquisition unit 1602 acquires the drag operation moving speed based on the distance between the latest touch point 1509 and the last but one touch point 1508 as well as based on the detection time interval between two touch points. In the example illustrated in FIGS. 15A to 15D, it is presumed that the acquired speed v is faster than a predetermined speed Vth.

Further, in step S1412, the speed acquisition unit 1602 acquires the distance between the latest touch point 1509 and the center point 1503 of the area 701 (i.e., the length of a dotted line 1510). Similarly, the speed acquisition unit 1602 acquires the distance between the latest touch point 1509 and a center point 1404 of the area 702 (i.e., the length of a dotted line 1511). According to the example illustrated in FIG. 14D, the speed v is faster than the predetermined speed Vth (i.e., threshold value). Therefore, the speed acquisition unit 1602 sets the processing in such a way as to be performed in the order of longnes in the acquired distance.

More specifically, the speed acquisition unit 1602 designates the area 701 as a region to be processed first and designates the area 702 as a region to be processed next (see step S1413). Accordingly, the person 501 can be recognized in the area of the face 502 where the object recognition processing is first performed (see step S214) and the name "A-san" of the person 501 can be displayed (see step S216).

As mentioned above, the information processing apparatus 100 according to the modified example 5 does not perform the object recognition processing until a user starts an object drag operation and controls the recognition processing order based on the speed at which the user has moved the object. This is because it is generally believed, based on the fact that the drop operation speed is faster, that the user intends to move the object to a further remote point.

Thus, in the modified example 5, it is feasible to efficiently acquire information about an object having a higher possibility of coinciding with the user's designated transmission destination while reducing the processing load of the information processing apparatus 100. Further, the information processing apparatus 100 continues the object recognition processing in another area according to the determined order. Therefore, the user can finally confirm all of the transmission destination candidates. For example, in a case where the drag and drop operation is repetitively performed two times or more, the processing efficiency is good because it is unnecessary to set the processing order again.

However, as described in the modified example 4, if a user performs a drop operation before the information processing apparatus 100 completes the object recognition processing for all areas, the information processing apparatus 100 can interrupt the object recognition processing and return to the touch operation recognition processing illustrated in FIGS. 13A and 13B.

In the above-mentioned exemplary embodiments and the modified examples, the operation to be performed on the touch panel display device 107 to identify a transmission target or a transmission destination is the operation to drag and drop a thumbnail image to a corresponding transmission destination. The above-mentioned conduct to convey a transmission target (e.g., a photo) to a transmission destination (e.g., a person or a printer) is a work resembling a human conduct possibly taken place in the real world to forward a photo to someone or insert it into a predetermined place of a printer. Accordingly, each user can attain his/her goal with an intuitively understandable operation.

However, the above-mentioned drag and drop operation can be replaced by any other operation performable on the touch panel display device to associate a transmission target candidate with a transmission destination candidate. For example, a user can sequentially (or simultaneously) tap an object and its transmission destination candidate at their display positions. Another usable operation is, for example, drawing a locus reaching the display position of a thumbnail image from a transmission destination candidate position.

Other Exemplary Embodiment

Further, the present invention can be realized by performing the following processing. More specifically, the processing includes supplying a software program functionally realizing the above-mentioned exemplary embodiment to a system or an apparatus via a network or an appropriate storage medium and causing a computer (or a CPU or a micro-processing unit (MPU)) installed on the system or the apparatus to read the program and execute the processing according to the program.

The present invention brings an effect of improving the operability in transmitting information to someone existing closely or to an information processing apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(trademark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-053600 filed Mar. 15, 2013, which is hereby incorporated by reference herein in its entirety.

The invention claimed is:

1. An information processing apparatus that is configured to transmit transmission target data to another information processing apparatus associated with a transmission destination, the information processing apparatus comprising:
   one or more processors; and
   memory storing executable instructions, which when executed by the one or more processors, cause the information processing apparatus to:
      display, on a display screen, a display area in which thumbnail images are arranged together with an image captured by an imaging unit, wherein the image captured by the imaging unit is a live view image;
      detect subjects corresponding to candidates for the transmission destination from subjects included in the captured image;
      receive an operation for moving a thumbnail image of the thumbnail images from the display area to a position on the captured image on the display screen;
      prioritize detection of an area including a subject designated as a transmission destination candidate based on moving speed information obtained during the operation for moving the thumbnail image;
      identify image data represented by the thumbnail image which has been moved according to the operation as the transmission target data and identify the transmission destination to which the identified transmission target data is transmitted, based on the position on the captured image to which the thumbnail image has been moved and positions of the subjects corresponding to candidates for the transmission destinations on the captured image; and
      transmit the transmission target data corresponding to the thumbnail image to the information processing apparatus associated with the identified transmission destination.

2. The information processing apparatus according to claim 1, wherein the operation is an operation to drag and drop the thumbnail image to a position corresponding to at least one subject on the live view image.

3. The information processing apparatus according to claim 1, wherein the instructions, when executed by the one or more processors, further cause the information processing apparatus to:
   recognize information identifying a subject detected by the detection.

4. The information processing apparatus according to claim 1, wherein the instructions, when executed by the one or more processors, cause the information processing apparatus to:
   prioritize detection of an area including a subject designated as a transmission destination candidate in a peripheral region of the captured image that includes a position where the operation for causing the thumbnail image to move has been terminated, in response to a termination of the operation for causing the thumbnail image to move.

5. The information processing apparatus according to claim 3, wherein the instructions, when executed by the one or more processors, cause the information processing apparatus to:
   detect an area including a subject designated as a transmission destination candidate; and
   recognize information identifying the subject, in response to a start of the operation for causing the thumbnail image to move, based on an image within the area detected.

6. The information processing apparatus according to claim 3, wherein the instructions, when executed by the one or more processors, cause the information processing apparatus to:

detect areas, each of the areas including a subject designated as a transmission destination candidate; and prioritize the recognition of information identifying the subject in an image of an area existing in a direction along which the thumbnail image is moved, in the areas detected.

7. The information processing apparatus according to claim 4, wherein the instructions, when executed by the one or more processors, cause the information processing apparatus to:

detect an area including the thumbnail image designated as the transmission destination candidate from a still image corresponding to one frame of the live view image in response to a termination of the operation.

8. The information processing apparatus according to claim 1, wherein the instructions, when executed by the one or more processors, further cause the information processing apparatus to:

recognize information identifying a subject detected by the detection, based on an image in an area including the subject in a still image corresponding to one frame of a live view image.

9. The information processing apparatus according to claim 8, wherein the instructions, when executed by the one or more processors, cause the information processing apparatus to:

acquire a name of the subject, as identification information of the subject, and explicitly present the acquired name adjacently to a corresponding subject on the live view image.

10. The information processing apparatus according to claim 8, wherein the instructions, when executed by the one or more processors, cause the information processing apparatus to:

acquire address information about the subject, as identification information of the subject, and select a method for transmitting the transmission target data according to a type of the acquired address information.

11. The information processing apparatus according to claim 4, wherein the instructions, when executed by the one or more processors, cause the information processing apparatus to:

explicitly present the area detected in an image currently displayed on the display screen.

12. A method for controlling an information processing apparatus that transmits transmission target data to another information processing apparatus associated with a transmission destination, the method comprising:

displaying, on a display screen, a display area in which thumbnail images are arranged together with an image captured by an imaging unit, wherein the image captured by the imaging unit is a live view image;

detecting subjects corresponding to candidates for the transmission destination from subjects included in the captured image;

receiving an operation for moving a thumbnail image of the thumbnail images from the display area to a position on the captured image on the display screen;

prioritizing detection of an area including a subject designated as a transmission destination candidate based on moving speed information obtained during the operation for moving the thumbnail image;

identifying image data represented by the thumbnail image which has been moved according to the operation as the transmission target data and identifying the transmission destination to which the identified transmission target data is transmitted, based on the position on the captured image to which the thumbnail image has been moved and positions of the subjects corresponding to candidates for the transmission destinations on the captured image; and transmitting the transmission target data corresponding to the thumbnail image to the information processing apparatus associated with the identified transmission destination.

13. The information processing apparatus according to claim 1, wherein the image data are photos.

14. The information processing apparatus according to claim 2, wherein the instructions, when executed by the one or more processors, cause the information processing apparatus to:

identify a subject corresponding to a position to which the thumbnail image has been dropped as the transmission destination.

15. The information processing apparatus according to claim 1, wherein the subjects detected by the detection are human faces, wherein the operation is an operation to drag and drop a thumbnail image to a position on the human of which a face is detected on the captured image, and wherein the instructions, when executed by the one or more processors, cause the information processing apparatus to:

identify the human located at the position where the thumbnail image has been dropped as the transmission destination.

16. The information processing apparatus according to claim 10, wherein the instructions, when executed by the one or more processors, cause the information processing apparatus to:

acquire an email address or an IP address as the address information, and, select, in a case where an email address is acquired, a method for transmitting an email having the transmission target data attached thereto to the email address, and select, in a case where an IP address is acquired, a method for transmitting the transmission target data directly to an information processing apparatus corresponding to the IP address.

17. The information processing apparatus according to claim 16, wherein the email address or the IP address is stored in a memory in association with image information of a human face to be detected as the subject.

18. The information processing apparatus according to claim 1, wherein the instructions, when executed by the one or more processors, cause the information processing apparatus to:

display a display screen including a second display area dedicated to the captured image and the display area dedicated to a list of the thumbnail images.

19. A non-transitory computer-readable medium storing executable instructions, which when executed by one or more processors of an information processing apparatus that is configured to transmit transmission target data to another information processing apparatus associated with a transmission destination, cause the information processing apparatus to perform operations comprising:

displaying, on a display screen, a display area in which thumbnail images are arranged together with an image captured by an imaging unit, wherein the image captured by the imaging unit is a live view image;

detecting subjects corresponding to candidates for the transmission destination from subjects included in the captured image;

receiving an operation for moving a thumbnail image of the thumbnail images from the display area to a position on the captured image on the display screen;

prioritizing detection of an area including a subject designated as a transmission destination candidate based on moving speed information obtained during the operation for moving the thumbnail image;

identifying image data represented by the thumbnail image which has been moved according to the operation as the transmission target data and identifying the transmission destination to which the identified transmission target data is transmitted, based on the position on the captured image to which the thumbnail image has been moved and positions of the subjects corresponding to candidates for the transmission destinations on the captured image; and transmitting the transmission target data corresponding to the thumbnail image to the information processing apparatus associated with the identified transmission destination.

\* \* \* \* \*